(12) United States Patent
Walter

(10) Patent No.: US 8,166,498 B2
(45) Date of Patent: Apr. 24, 2012

(54) SECURITY MONITORING USING A MULTIMEDIA PROCESSING DEVICE

(75) Inventor: Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1195 days.

(21) Appl. No.: 11/298,202

(22) Filed: Dec. 9, 2005

(65) Prior Publication Data
US 2006/0293100 A1 Dec. 28, 2006

Related U.S. Application Data

(63) Continuation-in-part of application No. 11/166,909, filed on Jun. 24, 2005, and a continuation-in-part of application No. 11/166,785, filed on Jun. 24, 2005, and a continuation-in-part of application No. 11/166,908, filed on Jun. 24, 2005, and a continuation-in-part of application No. 11/166,907, filed on Jun. 24, 2005.

(51) Int. Cl.
*H04H 60/56* (2008.01)
(52) U.S. Cl. .............................. 725/12; 725/59; 725/133
(58) Field of Classification Search .................. 725/133, 725/12, 59
See application file for complete search history.

(56) References Cited

U.S. PATENT DOCUMENTS

| | | | | |
|---|---|---|---|---|
| 5,956,081 A * | 9/1999 | Katz et al. | | 348/163 |
| 7,205,891 B1 * | 4/2007 | McGlothlin et al. | | 340/539.26 |
| 7,253,732 B2 * | 8/2007 | Osann, Jr. | | 340/541 |
| 2002/0147982 A1 * | 10/2002 | Naidoo et al. | | 725/105 |
| 2004/0205821 A1 * | 10/2004 | Yamada et al. | | 725/80 |
| 2005/0132414 A1 * | 6/2005 | Bentley et al. | | 725/105 |
| 2005/0222820 A1 | 10/2005 | Chung | | |
| 2005/0270151 A1 | 12/2005 | Winick | | |
| 2005/0273831 A1 * | 12/2005 | Slomovich et al. | | 725/105 |
| 2006/0022816 A1 | 2/2006 | Yukawa | | |
| 2006/0053447 A1 | 3/2006 | Krzyzanowski et al. | | |
| 2006/0078309 A1 | 4/2006 | Chen et al. | | |
| 2006/0085831 A1 | 4/2006 | Jones, III et al. | | |
| 2006/0090079 A1 | 4/2006 | Oh et al. | | |

* cited by examiner

*Primary Examiner* — Pankaj Kumar
*Assistant Examiner* — Charles N Hicks
(74) *Attorney, Agent, or Firm* — Toler Law Group, PC

(57) ABSTRACT

A system includes a multimedia data interface to receive data representative of one or more multimedia channels and a display interface to a display device, the display interface to provide processed multimedia data. The system further includes a security control module to receive alarm sensor data associated with one or more alarm sensors and an alarm premises display module coupled to the security control module and the display interface. The alarm premises display module includes logic to provide a premises diagram for display via the display interface, wherein the premises diagram illustrates a layout of monitored premises and logic to provide a representation of an alarm status of one or more premises locations based on the alarm sensor information.

30 Claims, 17 Drawing Sheets

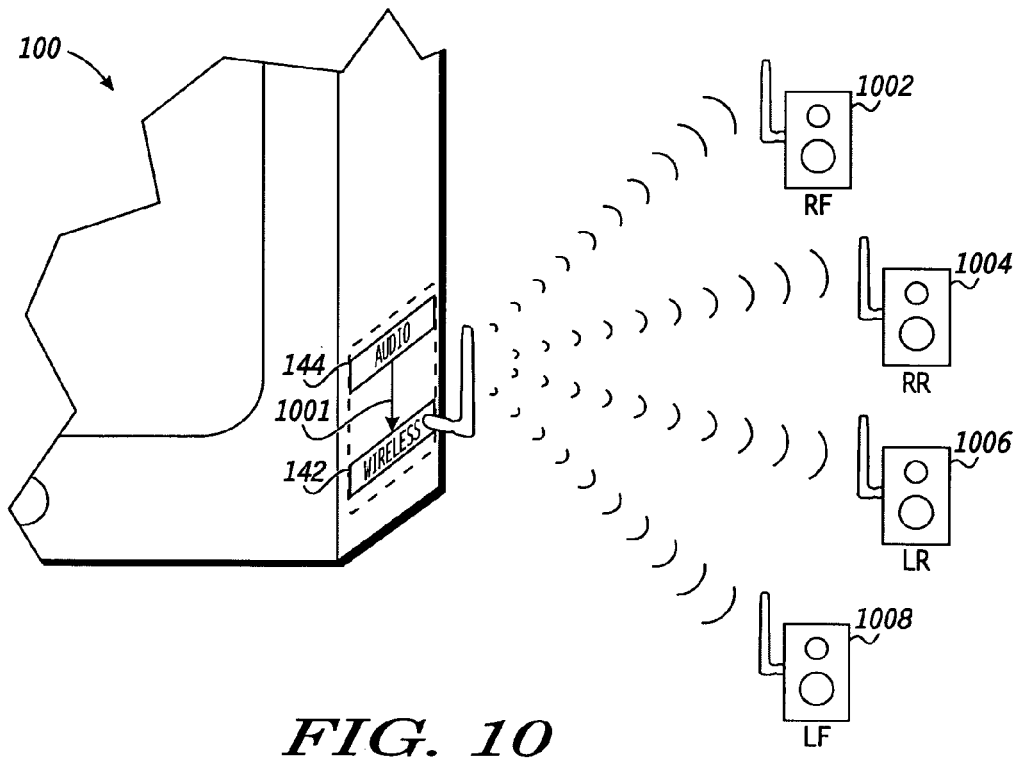
*FIG. 10*
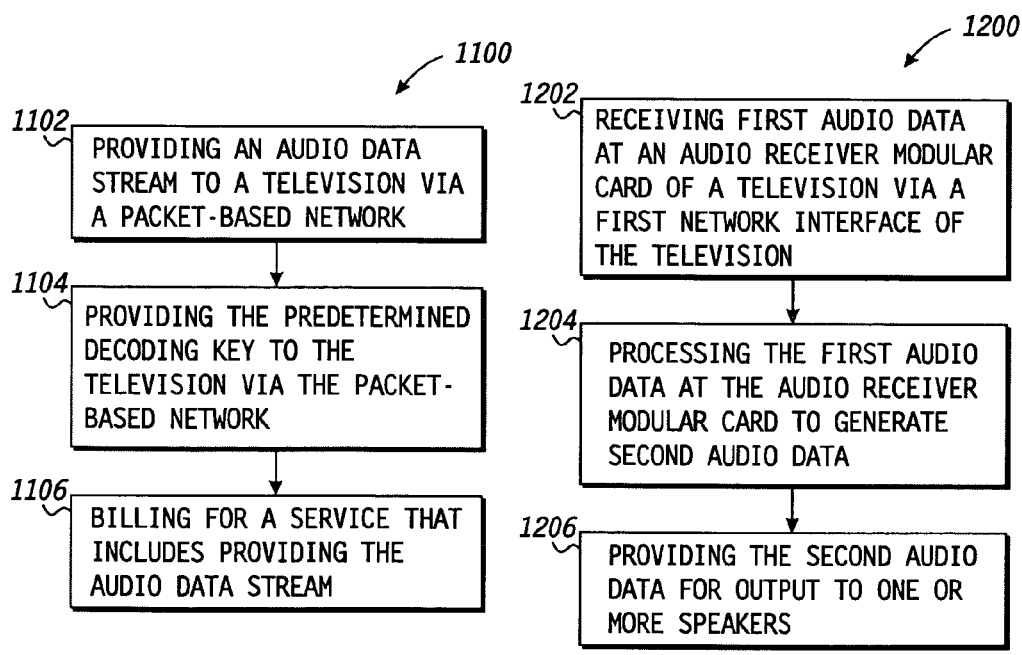
*FIG. 11*  *FIG. 12*

1700

1702 — PROVIDING A MULTIMEDIA DATA STREAM FOR RECEPTION BY A DISPLAY DEVICE, WHEREIN THE MULTIMEDIA DATA STREAM COMPRISES A FIRST CHANNEL HAVING VIDEO CONTENT REPRESENTING A FIRST LIST OF AVAILABLE VIDEO GAMES AND THEIR CORRESPONDING CHANNEL IDENTIFIERS AND A SECOND CHANNEL HAVING VIDEO GAME DATA ASSOCIATED WITH A FIRST VIDEO GAME OF THE FIRST LIST

1704 — BILLING FOR A SERVICE THAT INCLUDES PROVIDING THE MULTIMEDIA DATA STREAM

*FIG. 17*

SECURITY MONITORING USING A MULTIMEDIA PROCESSING DEVICE

CLAIM OF PRIORITY

The present application is a continuation-in-part application of, and claims priority to, each of the following: U.S. patent application Ser. No. 11/166,909, filed on Jun. 24, 2005 and entitled "Networked Television and Method Thereof," U.S. patent application Ser. No. 11/166,785, filed on Jun. 24, 2005 and entitled "Multimedia-Based Video Game Distribution," U.S. patent application Ser. No. 11/166,908, filed on Jun. 24, 2005 and entitled "Video Game Console Modular Card and Method Thereof," and U.S. patent application Ser. No. 11/166,907, filed on Jun. 24, 2005 and entitled "Audio Receiver Modular Card and Method Thereof," each of which is incorporated by reference in its entirety herein.

FIELD OF THE DISCLOSURE

The present application relates generally to providing security monitoring via a multimedia processing device.

BACKGROUND

Conventional consumer-level physical security monitoring systems typically are implemented as a central alarm panel connected via wiring to one or more alarm sensors at various locations of monitored premises, such as a residence. The alarm panel typically is implemented as a set of buttons and light-emitting diodes (LEDs) or an alphanumeric display that provide a limited indication of the current alarm status of the monitored premises. However, LEDs or alphanumeric display often are inadequate for the purpose of rapidly conveying sufficient information to a user since the relationship between the LEDs and their corresponding alarm sensor often isn't readily apparent and many conventional alphanumeric displays are capable of displaying only a limited amount of information at any given moment. Accordingly, a user may have difficulty in quickly assessing the alarm status of the monitored premises. Moreover, the alarm panel, by the nature of the security system wiring, typically is centrally located or located in a hallway near an entrance so that it may be quickly armed and disarmed upon a user's departure or arrival, respectively. However, these particular locations typically are inconvenient to a user who might be resting or relaxing in another room. Moreover, the typical locations necessitated by conventional alarm panels may place a user at risk of harm by an intruder as the user may come upon the intruder while attempting to reach the alarm panel to assess a signaled security breach. Accordingly, an improved technique for providing security monitoring would be advantageous.

BRIEF DESCRIPTION OF THE DRAWINGS

FIG. 10 is a diagram illustrating an exemplary distribution of audio content to speakers via a wireless medium in accordance with at least one embodiment of the present disclosure.

FIG. 11 is a flow diagram illustrating an exemplary method for processing audio data at a networked television in accordance with at least one embodiment of the present disclosure.

FIG. 12 is a flow diagram illustrating an exemplary method for providing audio data to a networked television for processing in accordance with at least one embodiment of the present disclosure.

FIG. 17 is a flow diagram illustrating an exemplary method for providing video game data via one or more transmission channels in accordance with at least one embodiment of the present disclosure.

DETAILED DESCRIPTION OF THE DRAWINGS

Figure 1:
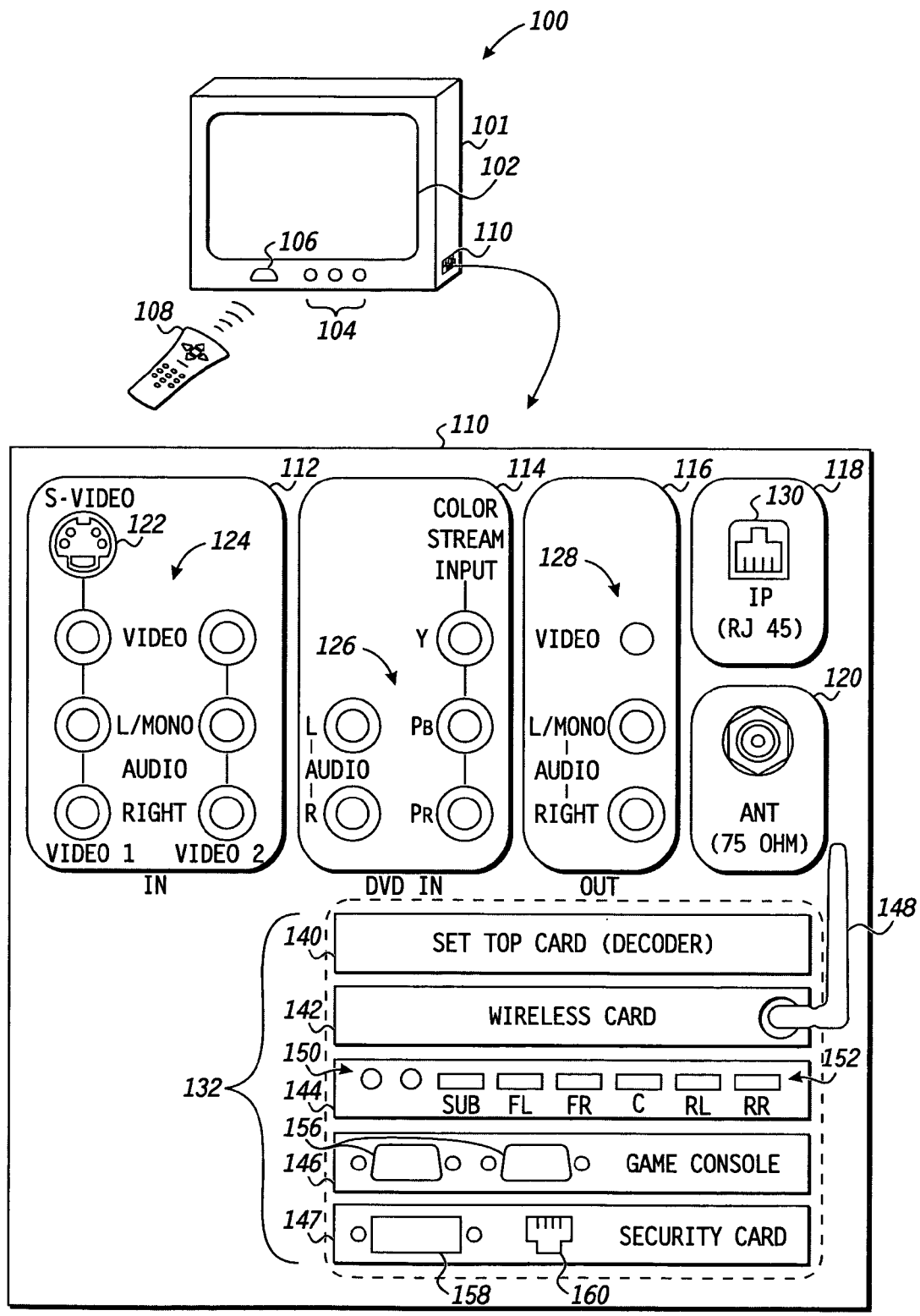
FIG. 1 is a diagram illustrating an exemplary networked television in accordance with at least one embodiment of the present disclosure.

In accordance with one aspect of the present disclosure, a television system includes a display device, a first modular card receptacle, and a security modular card coupled to the first modular card receptacle. The security modular card includes a security control module to receive alarm sensor information associated with one or more alarm sensors and an alarm premises display module. The alarm premises display module includes logic to provide a premises diagram for display via the display device and logic to provide a representation of an alarm status of one or more premises locations based on the alarm sensor information. In one embodiment, the premises diagram illustrates a layout of monitored premises.

In accordance with another aspect of the present disclosure, a set-top box includes a multimedia data interface to receive data representative of one or more multimedia channels and a display interface to a display device to provide processed multimedia data. The set-top box further includes a security control module to receive alarm sensor data associated with one or more alarm sensors and an alarm premises display module coupled to the security control module and the display interface. The alarm premises display module includes logic to provide a premises diagram for display via the display interface and logic to provide a representation of an alarm status of one or more premises locations based on the alarm sensor information.

In accordance with another aspect of the present disclosure, a method includes receiving multimedia data representative of one or more multimedia channels and processing at least a portion of the multimedia data associated with a selected multimedia channel. The method further includes providing the processed portion of the multimedia data for display. The method additionally includes receiving alarm sensor information associated with one or more alarm sensors positioned at monitored premises locations and determining a potential premises breach based on the alarm sensor information. The method also includes generating a premises diagram for display. In one embodiment, the premises diagram includes a graphical representation of a layout of the monitored premises and a graphical representation of an alarm status of one or more premises locations based on the alarm sensor information.

In accordance with yet another aspect of the present disclosure, a computer readable medium embodies a computer program. The computer program includes instructions to provide processed multimedia data associated with a multimedia channel to a display interface and instructions to determine a potential premises breach based on the alarm sensor information associated with one or more alarm sensors positioned at monitored premises. The computer program further includes instructions to generate a premises diagram for display. The premises diagram includes a graphical representation of a layout of the monitored premises and a graphical representation of an alarm status of one or more premises locations based on the alarm sensor information. The computer program further includes instructions to provide an alarm action interface to receive user input indicating a selected action in response to a potential premises breach indicated by the alarm sensor information and instructions to initiate the selected action.

Referring to FIG. 1, an exemplary networked television 100 is illustrated in accordance with at least one embodiment of the present disclosure. As depicted, the television 100 includes a housing 101 that contains a display 102, e.g., a liquid crystal display or a plasma display. Further, the housing 101 includes a plurality of user interface buttons 104, such as a power button, channel change buttons, volume control buttons, and the like. The housing 101 also includes a remote control interface 106, e.g., an infrared interface or a radio frequency (RF) interface, to receive remote control commands from a remote control 108. In a particular embodiment, one or more operations of the television 100 are responsive to the remote control commands. The television 100 further includes an interface panel 110 that is accessible via an external surface of the housing 101, at a top, back or side surface of the housing 101. The interface panel 110 includes one or more interfaces for receiving or outputting various forms of multimedia data. As shown, the interface panel 110 includes an IN component 112 that includes, for example, an S-video receptacle 122 or audio/visual receptacles 124 or a digital versatile disk (DVD) IN component 114 that is configured to receive video data and audio data from an external DVD player or other multimedia source. In particular, the DVD IN component 114 includes a plurality of receptacles 126 that can receive component video and audio. The panel 110 also can include an OUT component 116 that has receptacles 128 to provide video data and/or audio data to another television or recording device, such as a personal video recorder (PVR) or an external DVD player/recorder. An RF antenna receptacle 120 also can be incorporated into the panel 110 to receive multimedia data via RF transmissions.

In at least one embodiment, the panel 110 further includes a network interface 118 that includes a network receptacle 130 that can be connected to any of a variety of packet-based data networks. The receptacle 130 can be connected to an Internet Protocol (IP)-based network, e.g., an Ethernet network or an asynchronous transfer mode (ATM)-based network. Further, in a particular embodiment, the network interface 118 can include an Ethernet interface and as such, the network receptacle 130 can be an RJ-45 receptacle that is configured to receive an Ethernet cable that is connected to an Ethernet-based network. The television 100 can utilize the network interface 118 to receive multimedia data, e.g., video data, audio data, or videogame data, over a packet-based network for processing at the television 100. Moreover, the network interface 118 may be used by the television 100 to forward information to another networked device, such as another networked television 100. The forwarded information may include, for example, processed multimedia data or information associated with the multimedia data, information associated with a video game being played at the television 100, and the like. In another embodiment, the television 100 can utilize the network interface 118 to receive alarm sensor data directly from one or more alarm sensors positioned around monitored premises or via an alarm panel that is connected to the alarm sensors.

As illustrated in FIG. 1, the panel 110 further can include one or more modular card receptacles 132 (also commonly referred to as "expansion slots") to interface with one or more modular cards (also commonly referred to as "expansion cards") to enhance the functionality of the television 100. The modular cards can include, for example, a multimedia decoder modular card 140, a wireless network interface modular card 142, an audio receiver modular card 144, a video game console modular card 146, a security monitoring modular card 147, and the like. In a particular embodiment, the modular card receptacles 132 and the corresponding modular cards 140, 142, 144, 146, and 147 may be implemented using a standard architecture, such as a Peripheral Component Interconnect (PCI)-compliant architecture, an Industry Standard Architecture (ISA)-compliant architecture, or a Personal Computer Memory Card International Association (PCMCIA)-compliant architecture. Alternately, the modular card receptacles 132 and the corresponding modular cards 140, 142, 144, 146, and 147 may be implemented using a proprietary architecture, or a combination of standard and proprietary architectures.

To customize the functionality of the television 100, modular cards may be added to or removed from the television by inserting or removing the modular cards from their corresponding modular card receptacles. For example, the panel 110 may include an opening in the housing for each modular card receptacle 132 and each modular card receptacle 132 may receive a modular card that is inserted through the corresponding opening so that the contacts of the modular card receptacle interface are brought into secure contact with the contacts of the receiving modular card receptacle 132. Alternately, part or all of the panel 110 can be temporarily removed to install the modular card in a modular card receptacle 132. In at least one embodiment, some or all of the modular cards may include one or more interface receptacles that are accessible at the panel 110 to interface with other components.

In a particular embodiment, the incorporation of one or more modular cards into the television 100 allows for an expansion of the available functionality of the television 100. For example, the television 100 can incorporate the wireless network interface modular card 142 to provide wireless connectivity for the transmission of information to other networked devices. Moreover, the television 100 may incorporate the multimedia decoder modular card 140 to process multimedia data. The processing performed by the multimedia decoder modular card 140 may include, for example, decoding or transcoding encoded multimedia data, encoding unencoded multimedia data, decrypting encrypted multimedia data, and the like.

In an illustrative embodiment, the multimedia data processed by the decoder modular card 140 may be obtained from an external multimedia device, such as a DVD player, via the interfaces 122-128. Alternatively, the multimedia data may be received as a multimedia data stream via the network interface 118 or via the wireless interface modular card 142. The video content of the resulting processed multimedia data may be displayed on the display 102 or the resulting processed multimedia data may be provided to one or more networked devices via the network interface 118 or the wireless network interface modular card 142. Various exemplary techniques for processing multimedia data using the multimedia decoder modular card 140 are discussed in greater detail herein with respect to FIGS. 3-8.

The television 100 can also incorporate the audio receiver modular card 144 to process audio data for output to one or more speakers. In one embodiment, the audio receiver modular card 144 provides many of the features commonly found in separate stereo receivers. The audio data may be received from an external audio device, e.g., a portable music player, via one or more audio inputs 150. Alternately, the audio data may be received via the network interface 118 or the wireless network interface modular card 142. The resulting processed audio data may be provided to one or more wired speakers via speaker outputs 152 or the resulting processed audio data may be provided to one or more wireless speakers via, for example, the wireless network interface modular card 142. Various exemplary techniques for processing audio data using the audio receiver modular card 144 are discussed in greater detail herein with respect to FIGS. 9-12.

The television 100 further may incorporate the video game console modular card 146 to process video game data in response to controller input in order to generate game play for display at the display 102 and output via one or more speakers. The controller input relevant to the game play may be received via one or more controller interfaces 156 connected to corresponding game controllers, commonly referred to as "game pads" or "joysticks", via wired or wireless connections. Video game data processed by the video game console modular card 146 may be obtained from an external device, such as a DVD player that is capable of obtaining video game data from game CDs or DVDs. Additionally, the video game data may be obtained a networked device via the network interface 118 or the wireless network interface modular card 142. Moreover, the network interface 118 or the wireless network interface modular card 142 may be used to transmit game play information to other networked devices for use in, for example, a real-time multiple player video game. Various exemplary techniques for obtaining video game data and for video game processing by the video game console modular card 146 are discussed in greater detail herein with reference to FIGS. 14-18.

The television 100 additionally may incorporate the security monitoring modular card 147 to provide premises security information for display via the display 102. The physical security information can include, for example, a graphical user interface (GUI) having a premises diagram that represents the layout of monitored premises, including the types and locations of various alarm sensors and their current status (e.g., ready, armed, error, breached, etc.). The security monitoring modular card 147 also may provide a GUI to facilitate the generation of the premises diagram by a user via, for example, the remote control 108 and the remote control interface 106. Alarm sensor information representative of the status of the system can be received via the network interface 118, via the wireless modular card 142, or via a legacy alarm panel interface 158 of the security monitoring modular card 147. Further, in at least one embodiment, an integrated security card may implement the functions of the network interface 118, the wireless modular card 142, or a telephone interface 160 to contact a security operations entity (e.g., law enforcement or a security monitoring service) for premises breach notification purposes. Various exemplary techniques for security monitoring by the security monitoring console modular card 147 are discussed in greater detail herein with reference to FIGS. 19-22.

Figure 2:
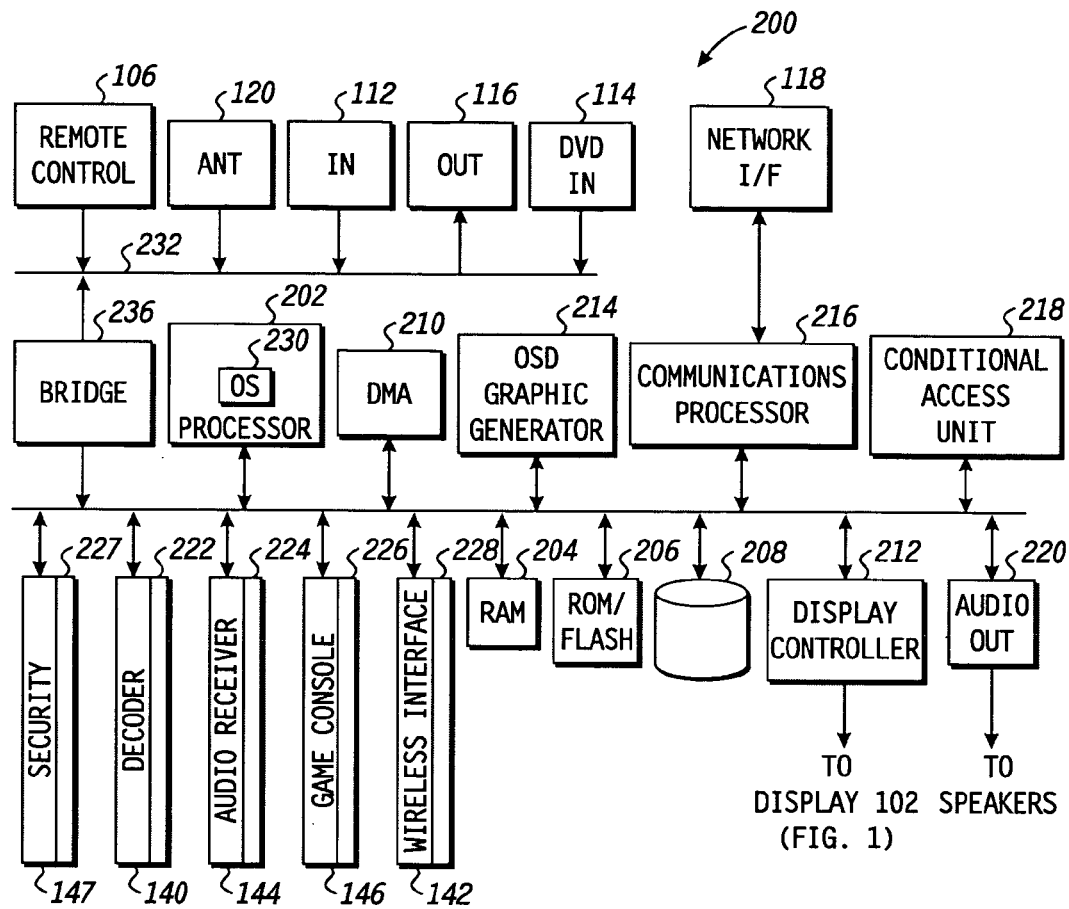
FIG. 2 is a block diagram illustrating an exemplary architecture of the networked television of FIG. 1 in accordance with at least one embodiment of the present disclosure.

Referring to FIG. 2, an exemplary implementation 200 of the television 100 is illustrated in accordance with at least one embodiment of the present disclosure. The television 100 includes one or more processors 202, one or more storage devices, such as a random access memory (RAM) 204, a read only memory or flash memory 206 or a hard disk 208, a direct memory access (DMA) controller 210 and a display controller 212 coupled to the display 102 (FIG. 1). The television 100 also can include an overlay graphics generator 214, a network communications processor 216 connected to the network interface 118, a conditional access unit 218, an audio output 220. The television 100 further can include modular card receptacles 222, 224, 226, 227, and 228 connected to the multimedia decoder modular card 140, the audio receiver modular card 144, the video game console modular card 146, the security monitoring modular card 147, and the wireless network interface modular card 142, respectively. As depicted in FIG. 2, the television 100 can further include the remote control interface 106, the RF antenna interface 120, the IN component 112, the OUT component 114 and the DVD IN component 114 of the panel 110 (FIG. 1). In the illustrated example, some components of the television 100 can be connected via a first bus 232 while other components can be connected via a second bus 234. Further, the busses 232, 234 can be connected by a bus bridge 236.

The processor 202 can perform multimedia processing routines in accordance with an operating system (OS) 230 and facilitates the functions performed by the modular cards that are connected to the modular card receptacles 222-228 of the television 100 by routing information between the components or by handling various aspects of the functions performed by the modular cards. In a particular embodiment, in order to provide prompt, real-time interaction with a television user, e.g., by displaying video content promptly upon request, the OS 230 is a real-time OS having specific functionality that is configured to streamline the operations of the processor 230 and limit the delay between receiving a user request and providing the requested action.

For example, in one embodiment, the OS 230 is stored in the flash memory 206 when the television is powered down, and upon a user request to power up the television, e.g., via the user control buttons 104 or the remote control interface 106, at least a portion of the OS 230 is loaded into a cache of the processor 230 so that the video content of a video data source selected at power up is provided for display within at least ten seconds of receiving the request, or within five seconds or within two seconds of receiving the user request. Additionally, the streamlined OS 230 can allow the television 100 to display video content promptly upon receiving other types of user requests, such as a user request to change television channels or a user request to activate game play associated with video game data processed by the video game console modular card 146. As such, the television 100 can provide the traditional television experience in which changes in the video content displayed and/or the audio content output occur promptly in response to the user's input as one or more requests.

During operation, the various components of the television 100 communicate information via the busses 232 and 234 in order to perform various multimedia-related functions. For example, the communications processor 216 provides communications protocol-specific processing for data received via the network interface 118 and for data to be transmitted on a packet-based network via the network interface 118. Further, the communications processor 216 may implement one or more functions associated with, the Open Systems Interconnection (OSI) seven-layer model or the Telecommunications Protocol/Internet Protocol (TCP/IP) stack. During operation, incoming data that is processed by the communications processor 216 can be routed to one or more of the components of the television 100 as appropriate. The DMA controller 210 can control access to the RAM 204 and/or the ROM 206 by the components of the television 100. Moreover, the overlay graphics generator 214 can generates overlay graphics that overlay the display graphics that are output to the display 102 by the display controller 212.

In a particular embodiment, the modular cards 140-147 may communicate information with each other and with other components of the television, e.g., the processor 202 or the display controller 212, using the modular card receptacles 222-228 and the bus 234. For example, the wireless network interface modular card 142 or the network interface 118 may be used to receive/transmit multimedia data for the decoder modular card 140, receive/transmit audio data for the audio receiver modular card 144, or receive/transmit video game data and related information for the video game console modular card 146. Alternately, multimedia data or video game data may be received via one or more of the RF antenna interface 120, the IN component 112, or the DVD IN component 114. Further, video data that represents video content may be provided from the decoder modular card 140 or the video game console modular card 146 to the display controller 212 so that the video content is displayed by the display 102. Similarly, audio data representing audio content may be provided from the audio receiver modular card 144 to the audio output 220 for output of the audio content by one or more speakers of the television 100. Additionally, security information for processing may be provided from the wireless interface modular card 142 or the network interface 118 to the security monitoring modular card 227. Likewise, display information generated by the security monitoring modular card 227 may be processed for display by the display controller 212.

Figure 3:
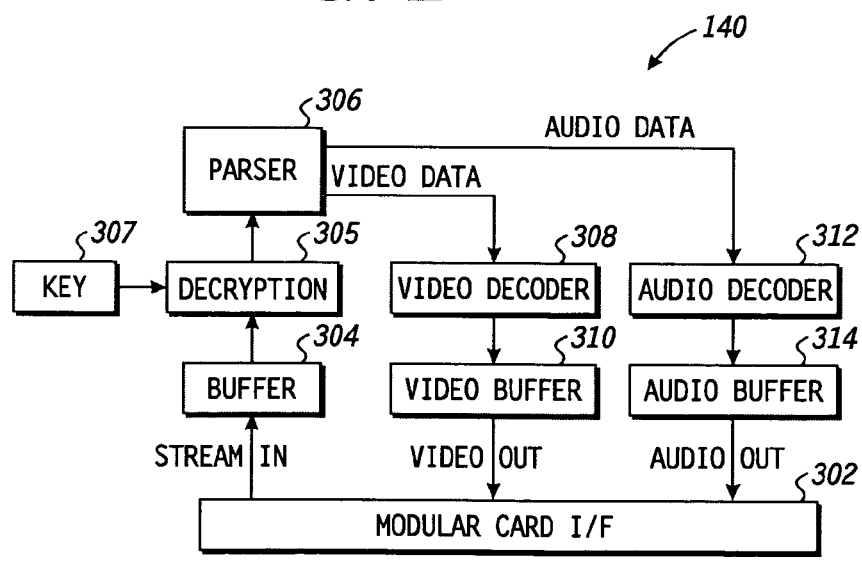
FIG. 3 is a block diagram illustrating an exemplary multimedia decoder modular card architecture in accordance with at least one embodiment of the present disclosure.

Referring to FIG. 3, an exemplary implementation of the multimedia decoder modular card 140 is illustrated in accordance with at least one embodiment of the present disclosure. In the example depicted, the multimedia decoder modular card 140 includes a modular card receptacle interface 302, an input buffer 304, a decryption module 305, a parser 306, a video decoder 308, a video output buffer 310, an audio decoder 312 and an audio output buffer 314. In a particular embodiment, the incoming buffer 304 and the output buffers 310 and 314 may be implemented together as a single buffer.

During operation, incoming multimedia data that is to be processed by the decoder modular card 140 is buffered in the incoming buffer 304. In at least one embodiment, the multimedia data is part of an MPEG data stream. Accordingly, the parser 306 parses the multimedia data to identify the relevant video and/or audio data to be processed. Then, the parser 306 provides the video data to the video decoder 308. The 308 decodes, or transcodes the video data and the resulting decoded/transcoded data can be stored in the outgoing video buffer 310 before being provided to the bus 234 (FIG. 2) for transmission to one or more components of the television 100. Similarly, the audio decoder 312 decodes or transcodes the audio data. Audio data is decoded/transcoded by the audio decoder 312 and the resulting decoded/transcoded audio data is buffered in the outgoing audio buffer 314 before being provided to the bus 234 for transmission to one or more other components of the television 100.

Alternately, in one embodiment, the received multimedia data includes unencoded multimedia data. In this instance, the video decoder 308 also may provide a video encoder to encode the video data to generate encoded video data (e.g., MPEG data) and the audio decoder 312 may include an audio encoder to encode the audio data to generate encoded audio data.

In at least one embodiment, the received multimedia data is encrypted or otherwise protected to prevent unauthorized access to the multimedia content. Accordingly, in at least one embodiment the integrated decoder modular card 140 further includes a decryption module 305 to process the protected multimedia data to generate unprotected multimedia data using a decryption key 307 supplied by, for example, a provider of the protected multimedia data. In one embodiment, the decryption module 305 processes the protected multimedia data before it is provided to the parser 306. Alternately, the decryption module 305 could be implemented at the output of the parser 306 or as part of the decoders 308 and 312.

Figure 4:
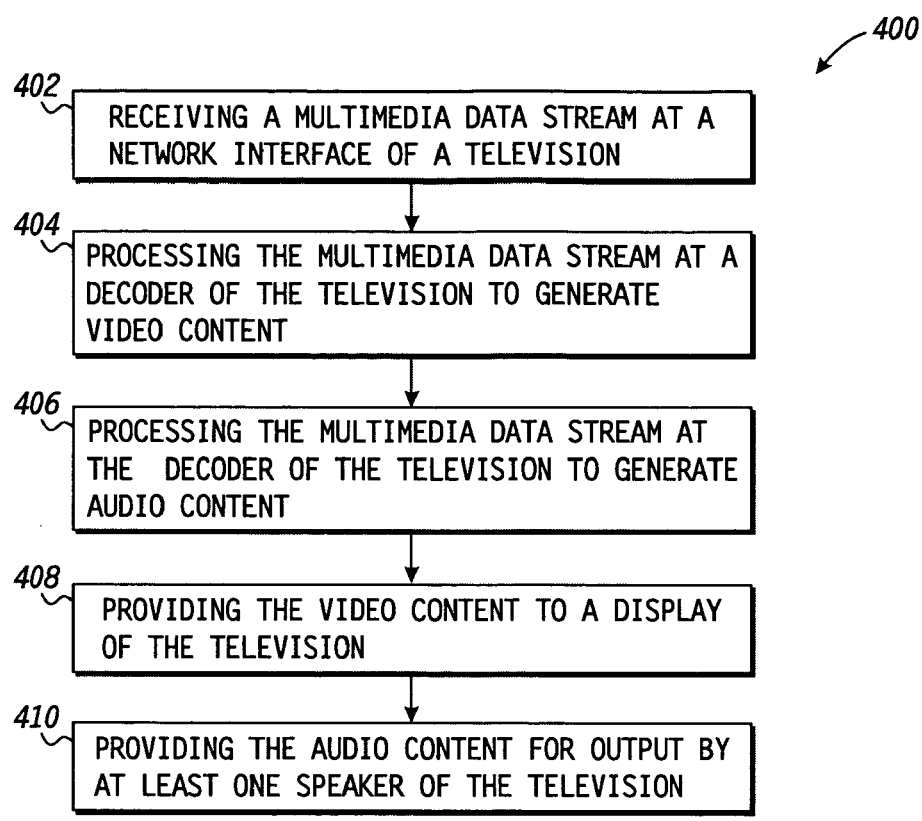
FIG. 4 is a flow diagram illustrating an exemplary method for processing multimedia data at a networked television in accordance with at least one embodiment of the present disclosure.

Referring to FIG. 4, an exemplary method 400 for processing multimedia data at a networked television is illustrated in accordance with at least one embodiment of the present disclosure. The method 400 includes receiving a multimedia data stream at the network interface 118 of the television 100 at block 402. At block 404, video data from the multimedia data stream is processed at a multimedia decoder of the television to generate video content. At block 406, audio data from the multimedia data stream is processed at the multimedia decoder of the television to generate audio content. The multimedia decoder may include a multimedia decoder that is integrated into a core processing component of the television (e.g., an MPEG decoder chip) or the multimedia decoder may include a multimedia decoder modular card 140, as illustrated in FIGS. 1-3. Further, in one embodiment, the audio data and video data are processed by separate components. To illustrate, the audio data can be processed by, for example, the audio receiver modular card 144 whereas the video data can be processed by an integrated multimedia decoder or the multimedia decoder modular card 140. At block 408, the video content is provided to the display 102 of the television 100 for viewing by a user. At block 410, the audio content is provided for output to one or more speakers. The speakers receiving the audio content may be speakers integrated with the television 100 or they may include, for example, speakers wired to the speaker outputs 152 (FIG. 1) or speakers wirelessly connected to the television 100 via the wireless network interface modular card 142 (FIG. 1).

Figure 5:
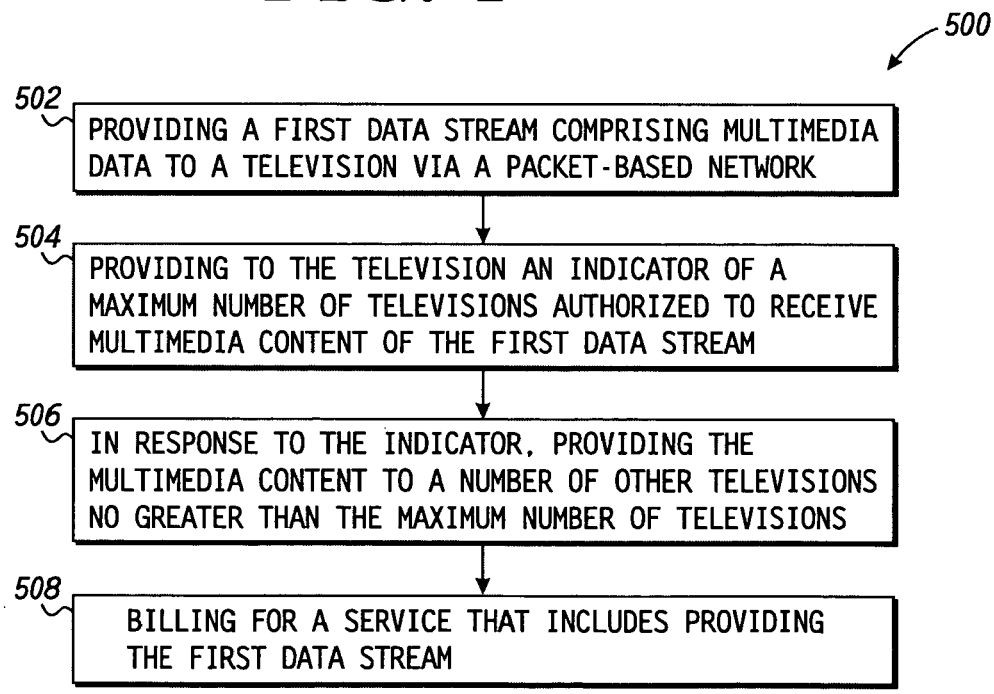
FIG. 5 is a flow diagram illustrating an exemplary method for providing multimedia data to a networked television in accordance with at least one embodiment of the present disclosure.

Referring to FIG. 5, an exemplary method 500 for providing multimedia data to the television 100 is illustrated in accordance with at least one embodiment of the present disclosure. The method 500 includes providing a first data stream including multimedia data from a content provider to the television 100 via a packet-based network, such as, for example, an IP-compliant network at block 502. As noted above, the television 100, in one embodiment, includes a network interface 118 (FIG. 1) to a packet-based network to receive multimedia data and a multimedia decoder to process the multimedia data. As noted above, the content provider may seek to limit distribution of the multimedia content represented by the multimedia data. Accordingly, at block 504, the content provider can provide an indicator of a maximum number of televisions authorized to receive the multimedia content represented by the first data stream. In response to this indicator, the television 100 can provide data representative of the multimedia content to a number of networked devices at block 506, where the number of networked devices receiving the multimedia content is limited based on the indicator. Further, in one embodiment, the content provider may bill the user of the television 100 for services that include providing the first data stream.

Figure 6:
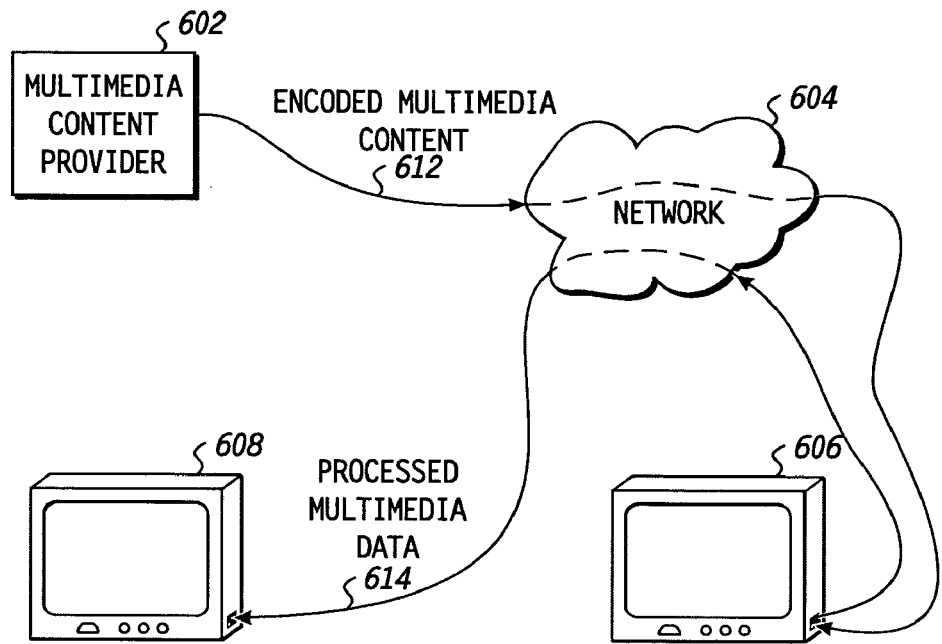
FIG. 6 is a diagram illustrating an exemplary distribution of processed multimedia content via a network in accordance with at least one embodiment of the present disclosure.
Figure 7:
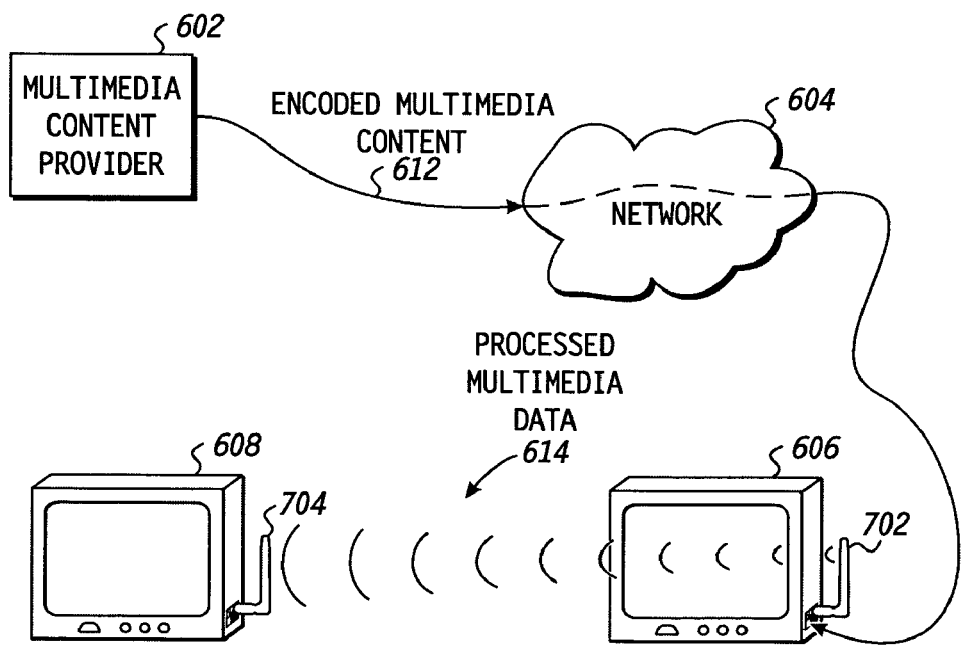
FIG. 7 is a diagram illustrating an exemplary distribution of processed multimedia data content via a wireless medium in accordance with at least one embodiment of the present disclosure.
Figure 8:
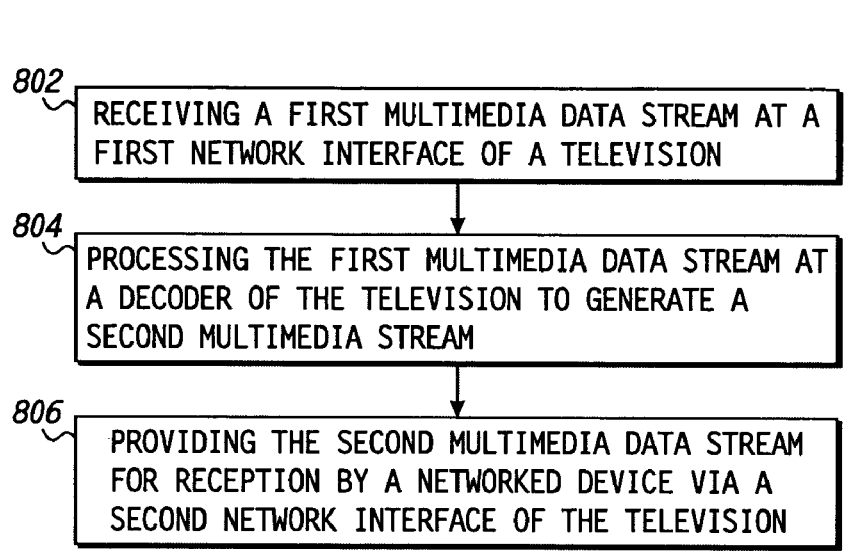
FIG. 8 is a flow diagram illustrating an exemplary method for distributing processed distributing multimedia content in accordance with at least one embodiment of the present disclosure.

Referring to FIGS. 6-8, an exemplary technique for redistributing multimedia data is illustrated in accordance with at least one embodiment of the present disclosure. As depicted by FIG. 6, a multimedia content provider 602 (e.g., an operation maintained by a cable television provider or telecommunications company) may be coupled to television 606 via a packet-based network 604, such as, for example, the Internet or a private network. As part of a broadcast, or in response to a user request, the content provider 602 provides encoded multimedia data 612 to the television 606 via the network 604. The encoded multimedia data 612 is received at the television 606 via a network interface (e.g., network interface 118, FIG. 1) connected to the network 604. The multimedia data 612 can be processed by a multimedia decoder of the television 606 (e.g., multimedia decoder modular card 140, FIG. 1) to generate processed multimedia data 614. Various operations performed on the multimedia data 612 by the television 606 to generate the processed multimedia data 614 may include decoding or transcoding the multimedia data 612, decrypting the multimedia data 612, and the like.

The resulting processed multimedia data 614 can be provided to one or more networked devices for further processing and/or display. In the example illustrated by FIG. 6, the processed multimedia data 614 is transmitted to another television 608 via the network 604. The television 608 may further process the multimedia data 614 for display or for storage. In the example illustrated by FIG. 7, the processed multimedia data 614 may be communicated wirelessly between the television 606 and the television 608 using wireless transceivers 702 and 704, respectively. The wireless transceivers 702 and 704 may be implemented as, for example, the wireless network interface modular card 142 (FIG. 1).

FIG. 8 illustrates an exemplary method 800 for redistributing multimedia content as described with respect to FIGS. 6 and 7. The method 800 includes receiving a first multimedia data stream at a first network interface of a television at block 802, wherein the first network interface is coupled to a packet-based network. The first multimedia data stream may be provided as a scheduled broadcast or may be provided by a content provider in response to a user request for the first multimedia data stream. At block 804, the first multimedia data stream is processed at a multimedia decoder of the television to generate a second multimedia data stream. The multimedia decoder can include, for example, an integrated multimedia decoder or the multimedia decoder modular card 140 (FIG. 1). The processing performed on the first multimedia data stream can include, for example, decoding the first multimedia data stream or transcoding the first multimedia data stream. Moreover, in one embodiment, the first multimedia data stream may include protected multimedia data. Accordingly, the processing performed on the first multimedia data stream further may include decrypting the first multimedia data stream including the protected multimedia data. At block 806, the second multimedia data stream is provided to a networked device via a second network interface of the television. The second multimedia data stream may be provided via the same packet-based network used to receive the first multimedia data stream. In this case, the second network interface and the first network interface may be the same network interface. Alternately, the second multimedia data stream may be provided via another packet-based network (e.g., a wireless network) and therefore may be a different network interface than the first network interface.

The exemplary techniques illustrated in FIGS. 6-8 allow a single television to act as the distribution point for multimedia content received from a content provider. To illustrate, because the television 100, in one embodiment, decodes and/or decrypts the encoded multimedia data 612 to generate unencoded and/or decrypted multimedia data 614, the networked devices receiving the multimedia data 614 (e.g., television 608) do not need to utilize a decoder and/or decryption module to process the multimedia data for display as video and/or audio content. As a result, the decoding/decryption components of the networked devices receiving the multimedia data 614 may be disabled, thereby reducing the power consumption of the networked devices. Moreover, the networked devices may be supplied without decoding/decryption components, thereby reducing their complexity and cost.

Figure 9:
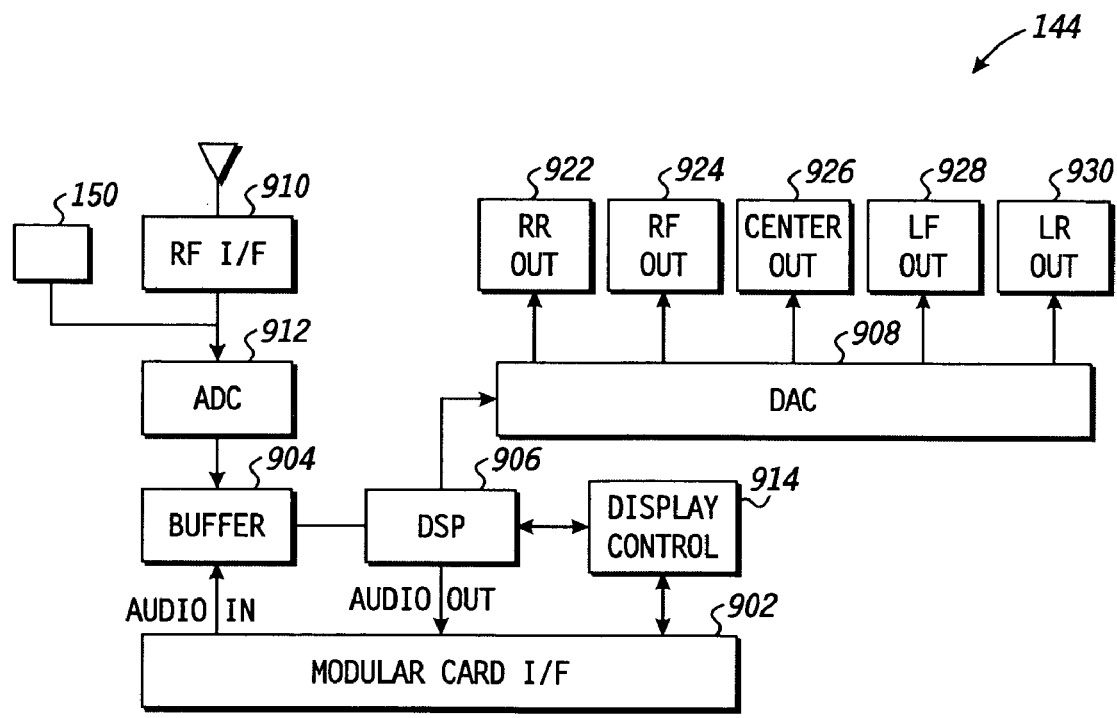
FIG. 9 is a block diagram illustrating an exemplary audio receiver modular card architecture in accordance with at least one embodiment of the present disclosure.

Referring to FIGS. 9 and 10, an exemplary implementation of the audio receiver modular card 144 is illustrated in accordance with at least one embodiment of the present disclosure. As illustrated, the audio receiver modular card 144, in one embodiment, includes a modular card receptacle interface 902, a buffer 904, one or more digital signal processors (DSPS) 906, a digital-to-analog converter (DAC) 908, an RF interface 910, an analog-to-digital converter (ADC) 912, a display control module 914, the audio input 150 and one or more speaker outputs 922-930.

In operation, audio data to be processed can be received from other components of the television via the modular card receptacle interface 902 or from an external audio source via the audio input 150 or via an RF transmission received at the RF interface 910 and converted to digital data by the ADC 912. The received audio data can be buffered in the buffer 904 until accessed by the DSP 906 for processing. Processing operations performed by the DSP 906 can include, for example, decoding (e.g., decoding from an MPEG or MP3 format), decryption, filtering, stereo enhancement, equalization and the like. For example, in one embodiment the DSP 906 performs surround sound processing of the audio data consistent with one or more surround sound standards, such as Dolby Digital 5.1, Dolby Digital Theater System (DTS) Surround, THX Surround EX™, and the like.

The resulting processed audio data may be provided to one or more other components of the television via the modular card receptacle interface 902. For example, the processed audio data may be provided for output to one or more wired speakers via the speaker outputs 922-930 after digital-to-analog conversion by the DAC 908. In the illustrated example, the speaker output 922 connects to a right rear (RR) speaker, the speaker output 924 connects to a right front (RF) speaker, the speaker output 926 connects to a center speaker, the speaker output 928 connects to a left front (LF) speaker and the speaker output 930 connects to a left rear (LR) speaker. Alternately, as illustrated with reference to FIG. 10, the processed audio data (illustrated as audio data 1001) can be provided from the audio receiver modular card 144 to the wireless network interface modular card 142 for transmission to one or more wireless speakers 1002-1008.

In at least one embodiment, the display control module 914 provides display content representing information about the audio receiver modular card 144 for display on the display 102 (FIG. 1). For example, the display control module 914 may provide graphical data representing equalization settings, where the graphical content of the graphical data is laid over video content from another source on the display 102. Other information for display can include, for example, volume settings, speaker setup, artist and track information, and the like. Moreover, in one embodiment, the operation of the audio receiver card module 144 is responsive to user commands (e.g., remote control commands). For example, after displaying the current equalization settings on the display 102, remote control commands from a user representing a desired change in equalization settings can be received by the display control module 914. In response, the display control module 914 can send a signal to the DSP 906 to change the equalization settings as well as provide updated equalization settings graphical display information for display by the display 102 so that the user can visual confirm that the requested changes are made. Other operations affected by user input can include, for example, volume settings, channel selection, track selection, speaker setup, surround sound settings, and the like.

Referring to FIG. 11, an exemplary method 1100 for providing audio data for processing at a networked television is illustrated in accordance with at least one embodiment of the present disclosure. The method 1100 includes providing an audio data stream to the television via a packet-based network at block 1102. In one embodiment, the television includes an exterior interface panel including a plurality of interface connections, a network interface to the packet based network to receive the multimedia data, and an audio receiver modular card (e.g., audio receiver modular card 144, FIG. 1) to process the audio data stream. In certain instances, a content provider may attempt to protect the audio data stream by encrypting the audio data. In such instances, the audio receiver modular card may have access to a decryption key provided by the content provider, at block 1104, or otherwise made available to the audio receiver modular card. The audio receiver modular card thus may use this decryption key to decrypt or otherwise decode the protected audio data. At block 1106, a user of the television is billed for services including providing the audio data stream to the television. For example, the user may have subscribed to a service and may receive a monthly bill.

Referring to FIG. 12, an exemplary method 1200 for processing audio data using the audio receiver modular card 142 is illustrated in accordance with at least one embodiment of the present disclosure. The method 1200 includes receiving first audio data at an audio receiver modular card of a television via a first network interface of the television (e.g., network interface 118 of television 100, FIG. 1) at block 1202. At block 1204, the first audio data is processed at the audio receiver modular card to generate second audio data. Processing operations performed by the audio receiver modular card may include, for example, decoding, filtering, formatting, and the like. At block 1206, the second audio data is provided for output to one or more speakers. In one embodiment, the second audio data is provided to one or more speakers via one or more speaker outputs of the audio receiver modular card. In an alternate embodiment, the second audio data is wirelessly transmitted to one or more wireless speakers via a wireless network interface of the television (e.g., wireless network interface modular card 142, FIG. 1).

Figure 13:
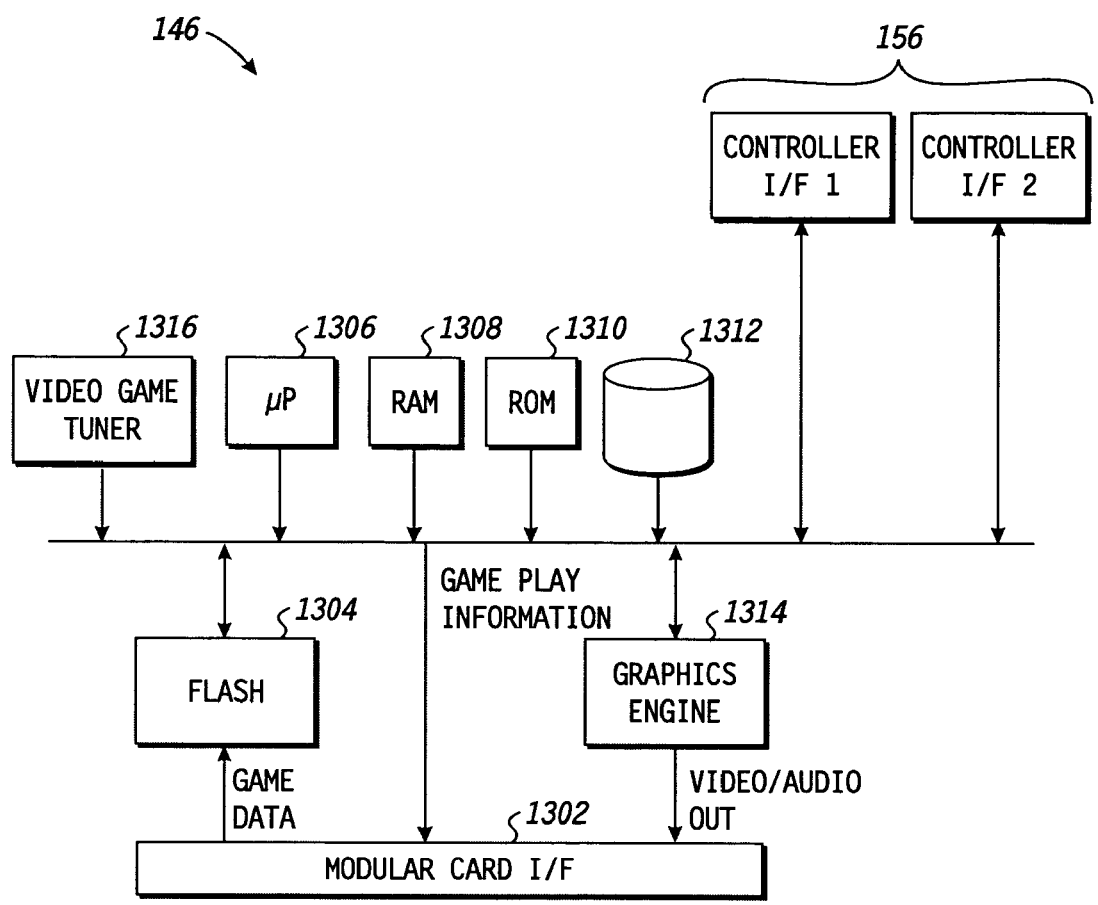
FIG. 13 is a block diagram illustrating an exemplary video game console modular card architecture in accordance with at least one embodiment of the present disclosure.

Referring to FIG. 13, an exemplary implementation of the video game console modular card 146 is illustrated in accordance with one embodiment of the present disclosure. In the depicted example, the game console modular card 146 includes a modular card receptacle interface 1302 for connecting to a modular card receptacle of the networked television 100 (FIG. 2), flash memory 1304, one or more processors 1306, RAM 1308, ROM 1310, a hard disk 1312, a graphics engine 1314, a video game tuner 1316, and one or more game controller interfaces 156.

In operation, video game data is provided to the television 100 via a network or by an external video game data source, such as a DVD player. The video game data is forwarded to the game console modular card 146 via the modular card receptacle interface 1302. The video game data may be stored in flash memory 1304, RAM 1308 and/or the hard disk 1312. The video game tuner 1316 manages the storage of video game data supplied to the television via one or more transmission channels.

The processor 1306 executes instructions represented by the video game data in response to user game controller signals received via the game controller interfaces 156. As noted above, the game controller interfaces 156 may include interfaces to wired game controllers or may include wireless interfaces to wireless game controllers. Data representing the video content of the game play is provided to the graphics engine 1314 whereupon the data is rendered into display data for output to the display 102 (FIG. 1) of the television. Data representing the audio content is processed by the processor 1306 or by an audio decoder (not shown) of the modular card 146. Alternately, the audio data is provided to the audio receiver card 144 or to the multimedia decoder card 140 for processing. The resulting audio content is output to one or more speakers associated with the television (e.g., integrated speakers or speakers connected via the audio receiver modular card 144, FIG. 1). The data representative of the video/audio content can be provided to a core component of the television 100 (e.g., the processor 202 or a dedicated television graphics engine) via the modular card receptacle interface 1302 for rendering into display data and output audio content.

In some instances, the game play represented by the video game data may be multiplayer game play that occurs among multiple players in separate locations. Accordingly, in at least one embodiment, the processor 1306 provides game play information for transmission by other game consoles involved in the same game play. To illustrate, the game play information is provided to the other components of the television 100 via the modular card receptacle interface 1302, whereby the game play information may be communicated to other networked game consoles via the network interface 118 (FIG. 1) or wirelessly communicated to other wireless game consoles via the wireless network interface modular card 142 (FIG. 1).

Figure 14:
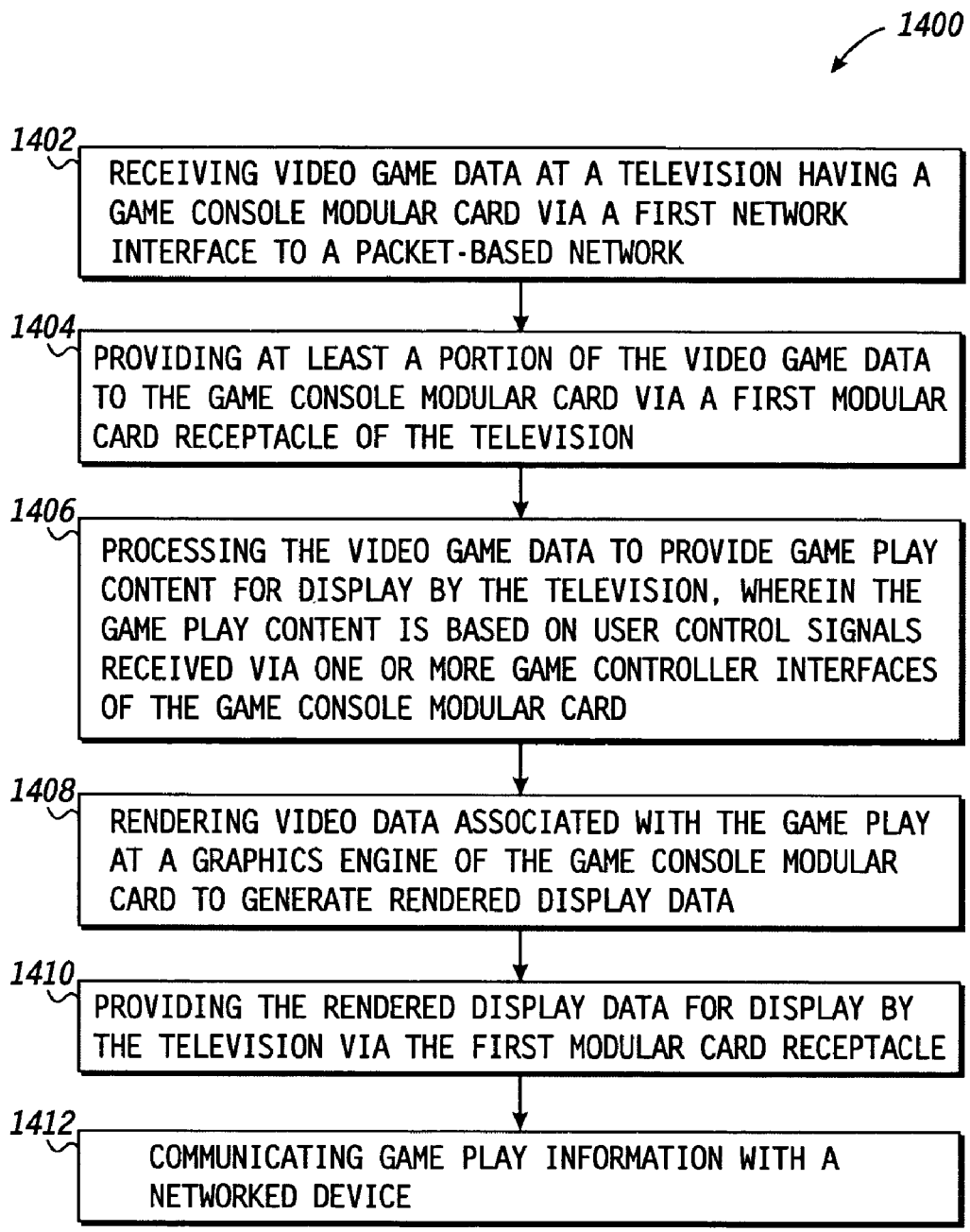
FIG. 14 is a flow diagram illustrating an exemplary method for processing video game data at a networked television in accordance with at least one embodiment of the present disclosure.

Referring to FIG. 14, an exemplary method 1400 for processing video game data at a video game console modular card of a television is illustrated in accordance with at least one embodiment of the present disclosure. The method 1400 includes receiving video game data at the television via a network interface to a packet-based network at block 1402. In one embodiment, the video game data is received as part of a multimedia data stream transmitted by a multimedia content provider via the packet-based network. For example, the video game data could be represented by one or more transmission channels of the multimedia data stream. At block 1404, at least a portion of the video game data is provided to the game console modular card (e.g., the game console modular card 146) via a first modular card receptacle of the television. At block 1406, the video game data is processed to provide game play content for display by the television, wherein the game play content is based on user control signals received via one or more game controller interfaces of the game console modular card. At block 1408, video game data associated with the game play is rendered at a graphics engine of the game console modular card to generate rendered display data, and, at block 1410, the rendered display data is provided for display via the first modular card receptacle. At block 1412, game play information is communicated with one or more networked devices (e.g., other networked televisions having game console modular cards) via the first network interface or via a second network interface, such as a wireless network interface modular card.

Figure 15:
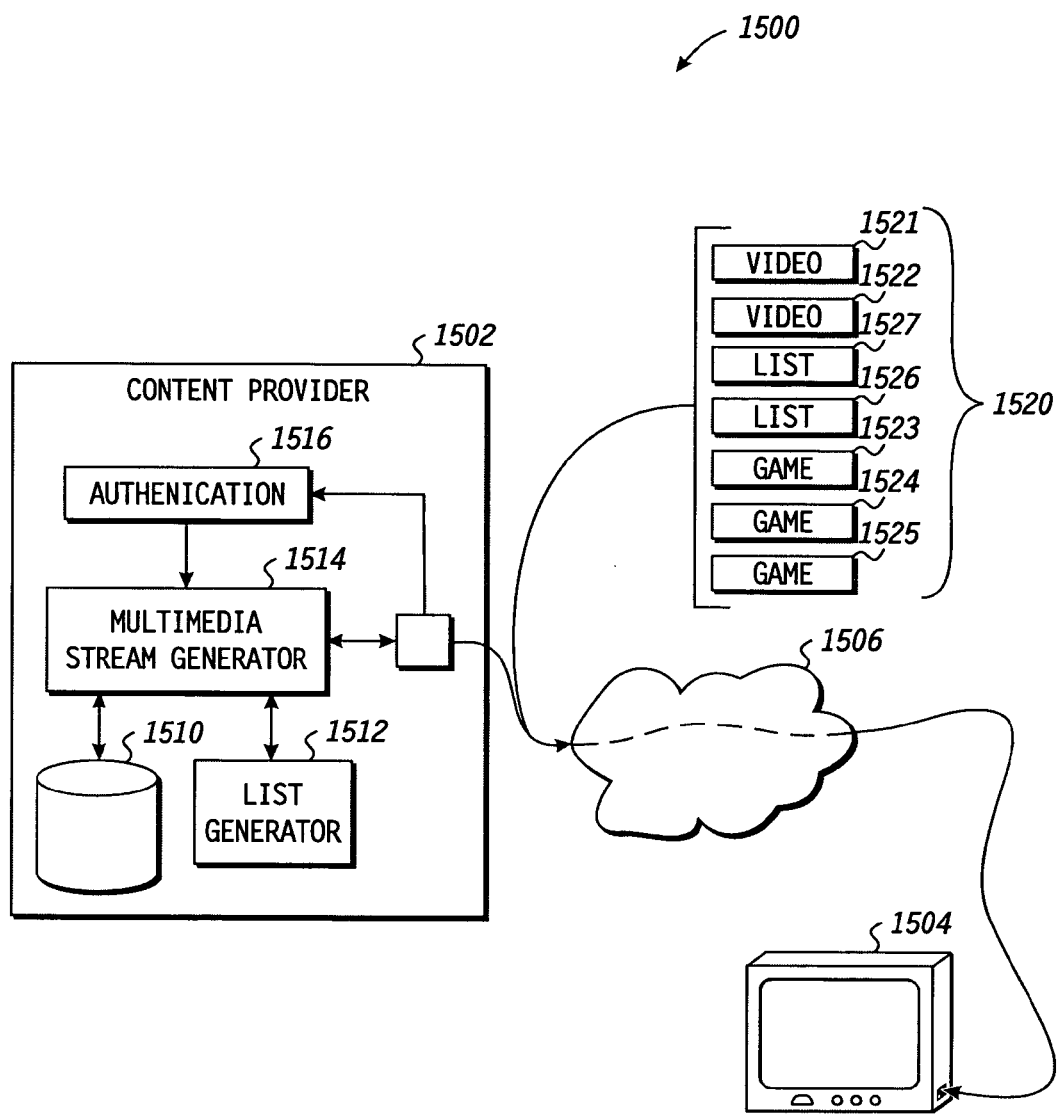
FIG. 15 is a diagram illustrating an exemplary provision of video game data via one or more television channels in accordance with at least one embodiment of the present disclosure.

Referring to FIGS. 15-18, exemplary techniques for providing video game data via one or more transmission channels are illustrated in accordance with at least one embodiment of the present disclosure. FIG. 15 illustrates an exemplary video game distribution system 1500 including a video game provider 1502 and a networked device 1504 connected via a network 1506. The networked device 1504 may include any of a variety of devices capable of receiving and processing multimedia transmissions comprising a plurality of transmission channels (such as, for example, a digital cable transmission or a satellite television transmission). For ease of illustration, the networked device 1504 is discussed in the context of a networked television as described in detail above.

In the illustrated embodiment, the video game provider 1502 includes video game data storage 1510 for storing video game data associated with one or more video games, a list generator 1512, a multimedia stream generator 1514, and an authentication module 1516.

In operation, the multimedia stream generator 1514 generates one or more multimedia data streams 1520 for transmission to the networked device 1504. In addition to transmission channels having conventional video and/or audio data representative of television programs or radio programs, such as video channels 1521 and 1522, one or more transmission channels of the multimedia data stream 1520 can include video game data, such as game channels 1523-1525. Accordingly, to download the video game data associated with a particular video game, the networked device 1504 may select the game channel of the multimedia data stream 1520 associated with a desired video game and may store video game data transmitted via the selected channel.

To illustrate, a user of the networked device 1504 may provide a remote control command or other user input that causes the networked device to "tune" to a transmission channel selected by the user. Once "tuned" to this channel, the networked device 1504 may provide a request for the associated video game data from the video game provider 1502. The authentication module 1516 authenticates an identifier associated with the user request to determine whether the user is authorized to access the video game data. If so authorized, the multimedia stream generator 1514 obtains the requested video game data from the video game data storage 1510 and inserts the requested video game data into the appropriate game channel of the multimedia data stream 1520. The authentication module 1516 further may store the request for video game data for billing purposes associated with providing the requested video game data.

Alternately, the video game data associated with one or more video games may be inserted by the multimedia stream generator 1514 in a repeating manner. In this instance, once the networked device 1504 is "tuned" to the selected game channel, the networked device 1504 may delay storing the video game data in the selected game channel until the starting byte of the video game data is retransmitted in the next iteration. Rather than waiting for the starting byte of the video game data, the networked device 1504 instead can identify an entry point where the networked device 1504 began storing video game data transmitted in the selected game channel and can cease storing video game data when the identified entry point is encountered again during the next transmit iteration of the video game data. For example, if the networked device 1504 tunes to the selected channel and starts recording the video game data at byte 1000, the networked device 1504 would continue to record the video game data through the end byte of the present iteration until byte 999 of the next iteration is encountered. Thus, the networked device 1504 can store the entire video game data without delaying until the start of the next iteration of the transmission of the video game data in the selected transmission channel.

The association of video games and their corresponding transmission channels may be provided to a user in any of a variety of ways. For example, a printed publication could be provided that indicates which transmission channels are used to carry the video game data of certain video games. However, the use of a printed publication typically results in a static assignment of channels and may cause inconvenience on the part of the user if the printed publication is misplaced or otherwise unavailable. Accordingly, in at least one embodiment, the list generator 1512 generates one or more lists for display as video content, where the lists, when displayed, provide an indication of available video games and identifiers (e.g., channel numbers) of their corresponding transmission channels. An exemplary display of a list is discussed below with reference to FIG. 16. The lists of available video games may be organized by any of a variety of characteristics, such as rankings, genres, costs, system requirements, and the like. To illustrate, the list generator 1512 can generate, for example, a list of the top five video game rentals, a list of the top ten best selling video games, a list of newly introduced video games, a list of action/adventure video games, a list of role-playing video games, a list of video games suitable for children, and other lists.

Multimedia data representative of the one or more generated lists can be provided to the networked device 1504 as one or more list channels, such as list channels 1526 and 1527, of the multimedia data stream 1520. Accordingly, when the networked device 1504 is "tuned" to a list channel, the network device 1504 may provide the video content representative of the list associated with the selected list channel for display at the networked device. The user, upon viewing the video content representative of the list, may ascertain the transmission channel carrying data for the video game in which the user is interested. The user then can direct the networked device 1504 to "tune" to the identified transmission channel (using, for example, remote control commands) so that the video game data can be obtained from the identified transmission channel and stored (e.g., at the hard disk 1312 of the video game console modular card 146, FIG. 13) for subsequent use.

Figure 16:
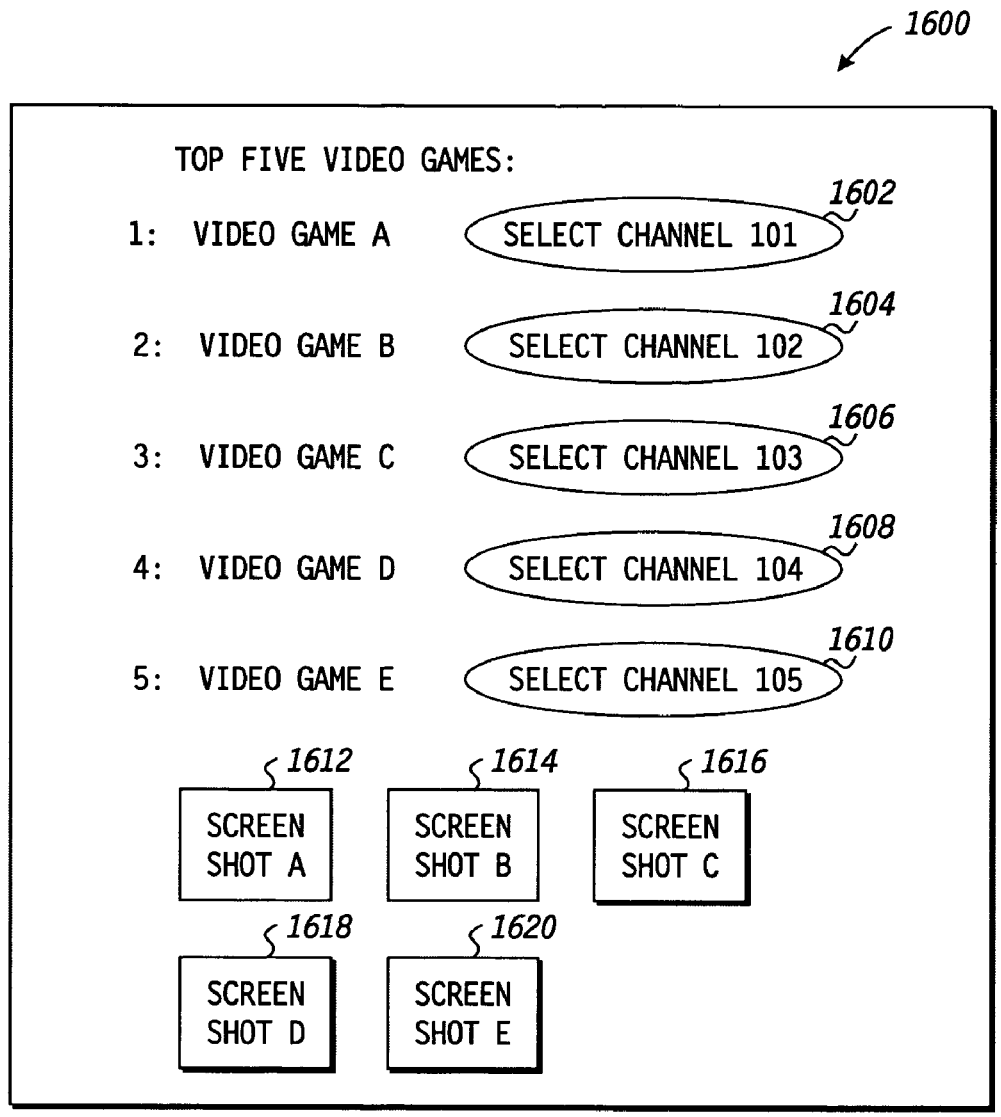
FIG. 16 is a diagram illustrating an exemplary video game download selection display screen in accordance with at least one embodiment of the present disclosure.

Referring to FIG. 16, an exemplary display of a list of video games at a networked device (e.g., the television 100, FIG. 1) is illustrated in accordance with at least one embodiment of the present disclosure. In the depicted example, the displayed list 1600 provides a listing of five available video games (video games A, B, C, D and E) identified as being the top five in rental frequency. Each video game listed also includes a visual indicator of the transmission channel that carries the video game data representing the video game. For example, the visual indicator may include "select channel" icons 1602-1610 corresponding to video games A-E, respectively, where the icons 1602-1610 provide a visual representation of the corresponding transmission channels (e.g., channels 101-105). The displayed list 1600 further may include screen shots 1612-1620 for one or more of the listed video games, as well as written descriptions, critic reviews or ratings of the listed video games (not shown).

Referring to FIG. 17, an exemplary method 1700 for providing video game data as one or more transmission channels of a multimedia data stream is illustrated in accordance with at least one embodiment of the present disclosure. At block 1702, a multimedia data stream is provided for reception by a display device, where the multimedia data stream includes a first channel having video content representing a first list of available video games and their corresponding channel identifiers and a second channel having video game data associated with a first video game of the first list and where the second channel is associated with a first channel identifier corresponding to the first video game. The multimedia data stream also can include other channels associated with other video games. The multimedia data stream can be provided as, for example, a digital cable television transmission or a satellite television transmission, a multimedia data stream transmitted over a packet-switched network. In at least one embodiment, the display device is a networked device, such as a networked television as discussed above.

To discourage unauthorized access, the video game data can be encrypted, such as at the video game content provider, prior to providing the multimedia data stream or prior to inserting the video game data into the multimedia data stream. Accordingly, a decryption key that is used to decrypt the encrypted video game data may be provided by the video game content provider or otherwise made available to the networked device. In one embodiment, the identification of the networked device is verified prior to providing or making the decryption key available. This verification process may include verifying that the particular display device and/or a particular user are authorized to use the video game data.

In one embodiment, the video game data associated with the first video game is provided in a continuous loop as the second transmission channel. Alternately, the video game data associated with the first video game is provided by a video game content provider in response to a user request for the video game data from the networked device. The user request may be initiated by a user remote control command directing the networked device to tune to the transmission channel identified by the first channel identifier.

As noted above, the multimedia data stream may represent the transmission of multimedia content in accordance with a service agreement or arrangement between a user and a content provider. Accordingly, at block 1704 the user's access of the video game data from the second channel is noted at the content provider and a charge is included in a billing statement sent to the user for the service that includes providing the multimedia data stream.

Figure 18:
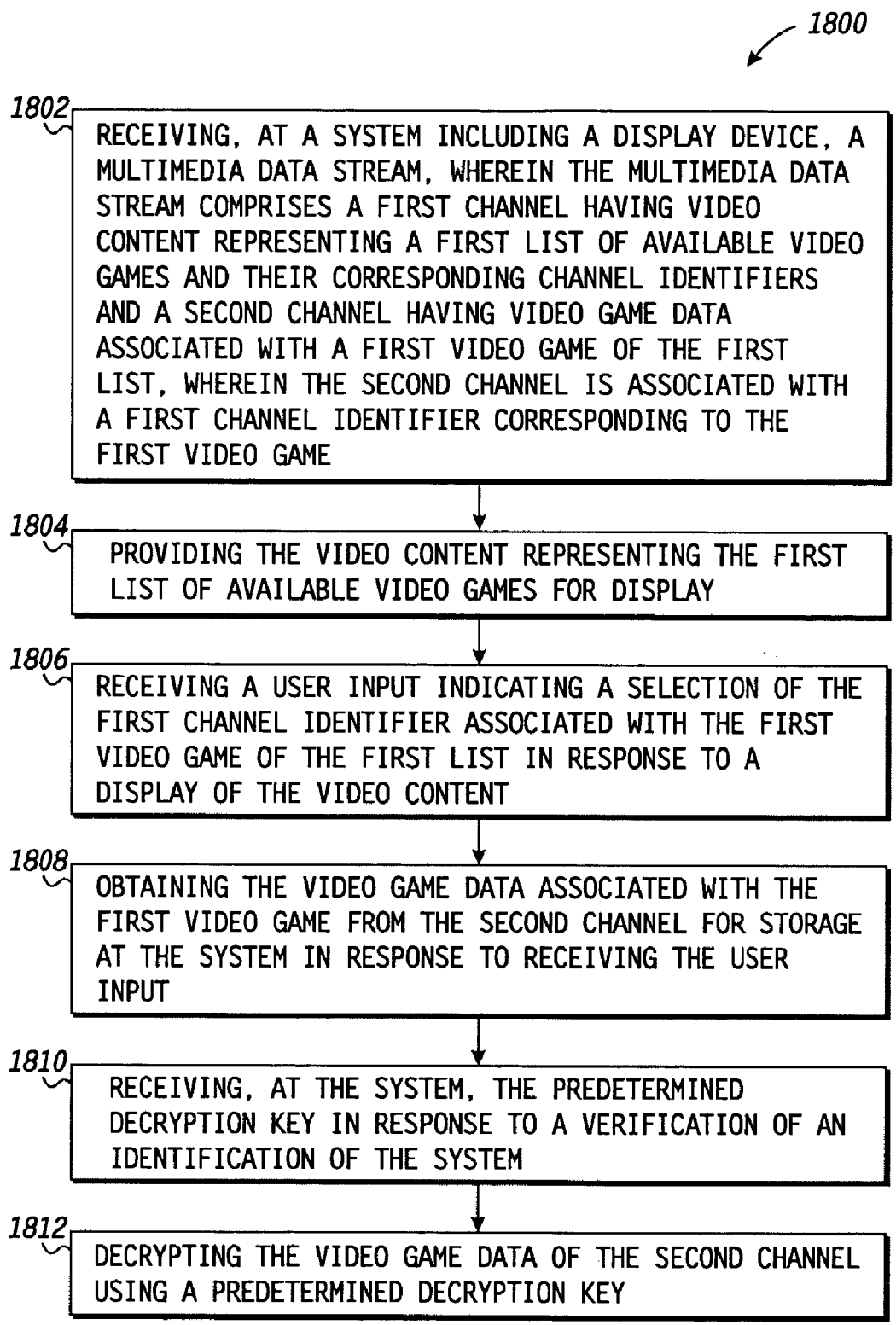
FIG. 18 is a flow diagram illustrating an exemplary method for obtaining video game data at a networked television in accordance with at least one embodiment of the present disclosure.

Referring to FIG. 18, an exemplary method 1800 for obtaining video game data from one or more channels of a multimedia data stream is illustrated in accordance with at least one embodiment of the present disclosure. The method 1800 includes receiving a multimedia data stream at a system including a display device at block 1802. The multimedia data stream includes a first channel having video content representing a first list of available video games and their corresponding channel identifiers and a second channel having video game data associated with a first video game of the first list. The second channel is associated with a first channel identifier corresponding to the first video game. In one embodiment, the system includes a networked television (e.g., television 100, FIG. 1) having a game console modular card (e.g., game console modular card 146, FIG. 1) to process the received data. In one embodiment, the storage of video game data at a hard disk 1312 (FIG. 13) of the game console modular card 146 is handled by the video game tuner 1316.

At block 1804, the video content representing the first list of games is provided for display at the display device. In the event that the system includes a networked television as described above, the networked television may include a decoder, such as an integrated decoder or a decoder modular card 140 (FIG. 1) to generate display data representative of the video content of the first channel for viewing by the user. At block 1806, user input indicating a selection of the first channel identifier associated with the first video game of the first list is received in response to display of the video content. The user input may include, for example, a request to "tune" the system to the transmission channel associated with the first channel identifier, where the request may be a remote control command or input received via, for example, a channel change button.

At block 1808, the video game data associated with the first video game from the second channel is obtained for storage at the system in response to receiving the user input. As noted above, the video game data may be provided in a single transmission at a predetermined time or in a continuous loop or the video game data can be added to the multimedia data stream in response to a request by the user. In the event that the data is provided in a continuous loop, obtaining the video game data can include identifying a start position within a present loop of the video game data and continuing to store the video game data until a corresponding position to the start position is encountered for the next loop of the video game data. In the event that the video game data is encrypted, at block 1810, a decryption key can be received at the system in response to a verification of an identification of the system. At block 1812, the video game data can be decrypted using the decryption key. In the event that the system includes the networked television 100, the obtained video game data can be stored at the hard disk 1312 (FIG. 13) of the video game console modular card 146 of the television 100 for subsequent processing to provide game play to a user.

Figure 19:
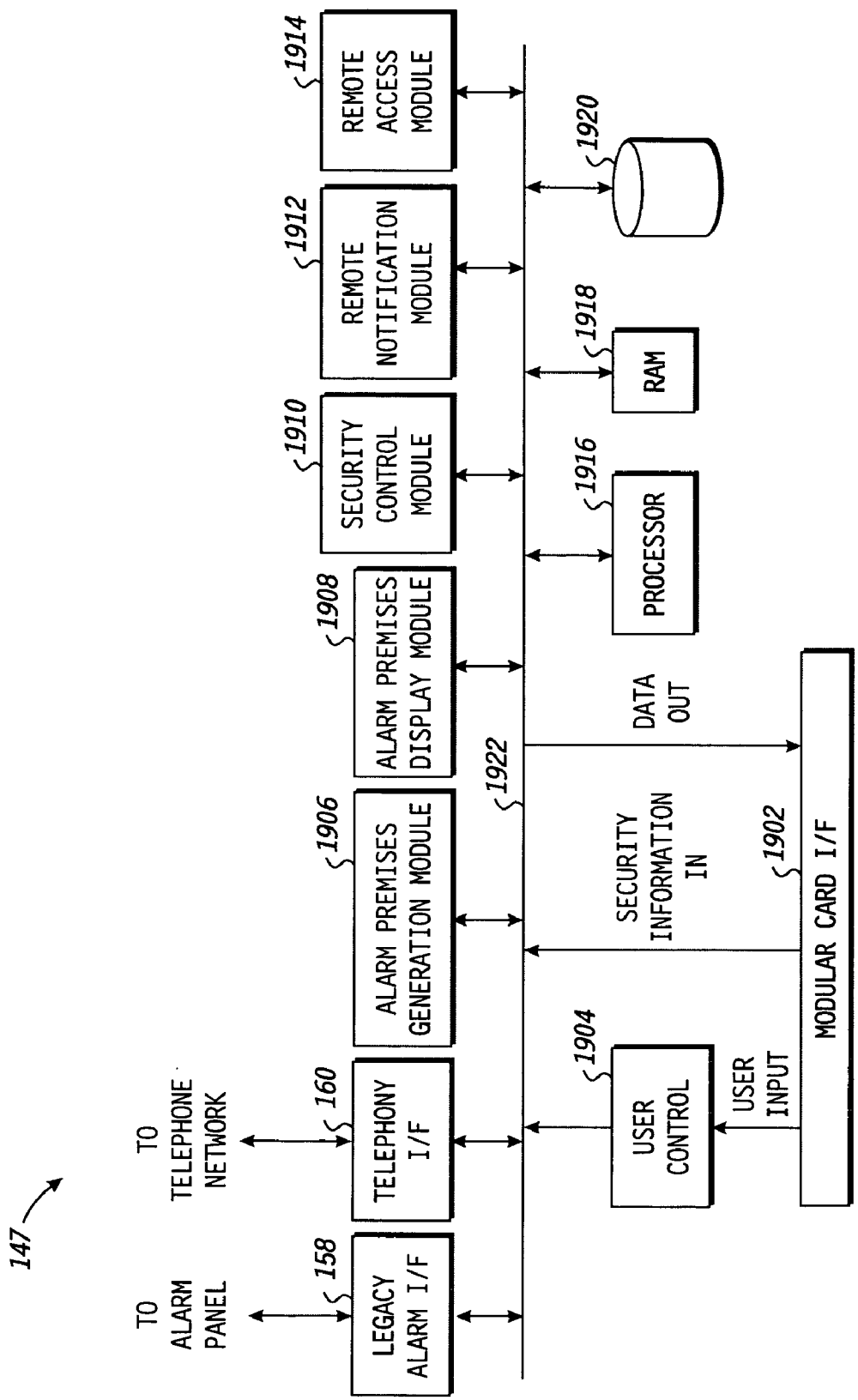
FIG. 19 is a block diagram illustrating an exemplary security monitoring modular card architecture in accordance with at least one embodiment of the present disclosure.

Referring to FIG. 19, an exemplary implementation of the security monitoring modular card 147 of FIG. 1 is illustrated in accordance with at least one embodiment of the present disclosure. In the example depicted, the security monitoring modular card 147 includes the legacy alarm panel interface 158, the telephony interface 160, a modular card receptacle interface 1902, a user control module 1904, an alarm premises generation module 1906, an alarm premises display module 1908, a security control module 1910, a remote notification module 1912, a remote access module 1914, a processor 1916, memory (e.g., random access memory (RAM)) 1918, and mass storage 1920 (e.g., flash memory or a hard drive). The components of the security monitoring modular card 147 may be connected directly, via one or more busses 1922, or a combination thereof. The components of the security monitoring modular card 147 may be implemented as hardware, firmware, software, or combinations thereof. To illustrate, the modules 1904, 1906, 1908, 1910, 1912, and 1914 may be implemented, in whole or in part, as one or more computer programs represented as instructions stored in the memory 1918 and executed by the processor 1916 to perform the processes described herein.

During operation, security information to be processed by the security monitoring modular card 147 is received via the modular card interface 1902. The security information may be received at the television 100 via the network interface 118 (FIG. 1), the wireless interface modular card 142 (FIG. 1), or the legacy alarm panel interface 158. The security information can include, for example, alarm sensor information, user premises layout information, alarm action command information, and the like. The alarm sensor information includes information from one or more alarm sensors, such as, for example, video data from a security camera, status information (e.g., armed, unarmed, breached) from a door sensor, window sensor, trip sensor (e.g., an infrared light sensor), an ultrasonic window breakage sensor, and the like. Similarly, data generated by the security monitoring modular card 147, such as display information representing a monitored premises layout, alarm statuses, potential breaches, and the like, can be provided for output to other components of the television 100 via the modular card receptacle interface 1902. Alarm sensor information can be provided from alarm sensors to the television 100 (FIG. 1) as an analog signal transmitted over wiring connecting the sensors to an alarm panel or directly to the television 100. Alternately, one or more of the alarm sensors can be connected to a data network whereby alarm sensor information is transmitted via the data network. Further, in one embodiment, one or more of the alarm sensors can include a wireless transmitter, such as a Bluetooth-based transmitter or an IEEE 802.11-based transmitter, to wirelessly communicate alarm sensor information to an alarm panel or the television 100 via, for example, the wireless interface modular card 142 (FIG. 1).

The alarm premises generation module 1906 facilitates the generation of a premises diagram that represents the layout of monitored premises, including the locations of various alarm sensors and their statuses. In one embodiment, the alarm premises generation module 1906 provides a premises diagram generation GUI for display whereby a user can interact with the GUI via remote control commands, for example, to provide premises information used by the alarm premises generation module 1906 to generate the premises diagram. The premises information may be received at and processed by the user control module 1904 to generate diagram input for use by the alarm premises generation module 1906. The alarm premises generation module 1906 may implement a standard graphical drawing program, such as AutoCAD™, Microsoft™ Visio™, Microsoft™ PowerPoint™, or a proprietary interface to facilitate the creation of the premises layout. An illustrative implementation of a premises diagram generation GUI is discussed in greater detail with reference to FIG. 20.

Data representative of the generated premises diagram is used by the alarm premises display module 1908 to generate a premises status GUI for display. The premises status GUI includes the generated premises diagram, as well as visual and/or audible representations of the alarm status of one or more of the alarm sensors determined from the received alarm sensor information. The premises status GUI also includes an alarm action interface to provide a user with a number of selectable actions, such as arming the security system, disarming the security system, suppressing a premises breach alarm, or contacting a security operations entity. An illustrative implementation of a premises status GUI is discussed in greater detail with reference to FIG. 21.

The alarm status (armed, disarmed, error, breached, etc.) of the alarm sensors is determined from the alarm sensor information by the security control module 1910. As part of this determination, the security control module 1910 may implement a status verification process whereby the alarm statuses of the alarm sensors are correlated to determine whether an alarm sensor that is signaling a potential breach is malfunctioning. To illustrate, assume that a window sensor, a sonic sensor and a trip-line sensor are positioned at a window of an external wall. In this instance, it is likely that an intruder entering through the window would set off all three sensors in the process of forcibly entering the premises. Accordingly, in the event that the window sensor signals a potential breach, the security control module 1910 can monitor the statuses of the sonic sensor and the trip-line sensor to determine if they also register a potential breach. If not, the security control module 1910 may take a predefined action, such as directing the alarm premises display module 1908 to include a user notification of the alarm status of the window sensor for display at the television 100. Otherwise, if one or both of the sonic sensor and the trip-line sensor also is registering a potential breach, the security control module 1910 may take a more cautious predefined action, such as by sounding an alarm siren at the monitored premises and by contacting a security operations entity via, e.g., the telephony interface 160.

The security control module 1910, in one embodiment, initiates or performs one or more actions selected by a user while interfacing with the premises diagram GUI provided by the alarm premises display module 1908. For example, when presented with a notification of a potential breach via the premises diagram GUI, the user may select to suppress the alarm. Accordingly, the security control module 1910 may send a reset signal to the triggered alarm sensor or the alarm panel to reset the alarm sensor. Alternately, the user may choose to notify a security operations entity, in which case the security control module 1910 may contact the security operations entity via the telephony interface 160 or the remote notification module 1912. As another example, the user may choose to disarm the system, whereby the security control module 1910 sends a disable signal to the alarm sensors or the alarm panel, or configures itself to ignore alarm sensor information until the system is rearmed. As yet another action selected in response to a potential breach notification, the user may request the display of video content captured by a video camera in the area of the potential breach. Accordingly, the security control module 1910 may direct the alarm premises display module 1908 to incorporate the video content into a video display window of the premises diagram GUI.

The security control module 1910 can contact a security operations entity using either the telephony interface 160 or the remote notification module 1912. Using the telephony interface 160, the security control module 1910 can communicate a security status message, such as a request for security patrol, a notification of a medical emergency, or a notification of a false alarm, to a human operator via a voice synthesizer (not shown) or a prerecorded message. The security status message further may include premises breach information, such as the location and type of premises breach, captured video content of the location in question, and the like. Alternately, the security control module 1910 can use the telephony interface 160 to provide a facsimile transmission indicating the security status message. The remote notification module 1912 can be used to transmit a digital security status message in the form of, for example, an email, an SMS message, an instant message (IM), and the like. The digital security status message can be transmitted to its destination via, for example, the network interface 118 (FIG. 1) or the wireless interface modular card 142 (FIG. 1) of the television 100.

The remote access module 1914 provides a user remote access to the security system status via a data network connected to the television 100. In one embodiment, the remote access module 1914 includes a webserver to provide the security system status in the form of a webpage. The webpage information provided by the remote access module 1914 can include, for example, an emulation of the premises diagram GUI provided by the alarm premises display module 1908, including the current alarm statuses of the alarm sensors positioned at the monitored premises. In the event of a potential breach or a determined malfunction, the user can remotely initiate one or more actions via the supplied webpage.

Figure 20:
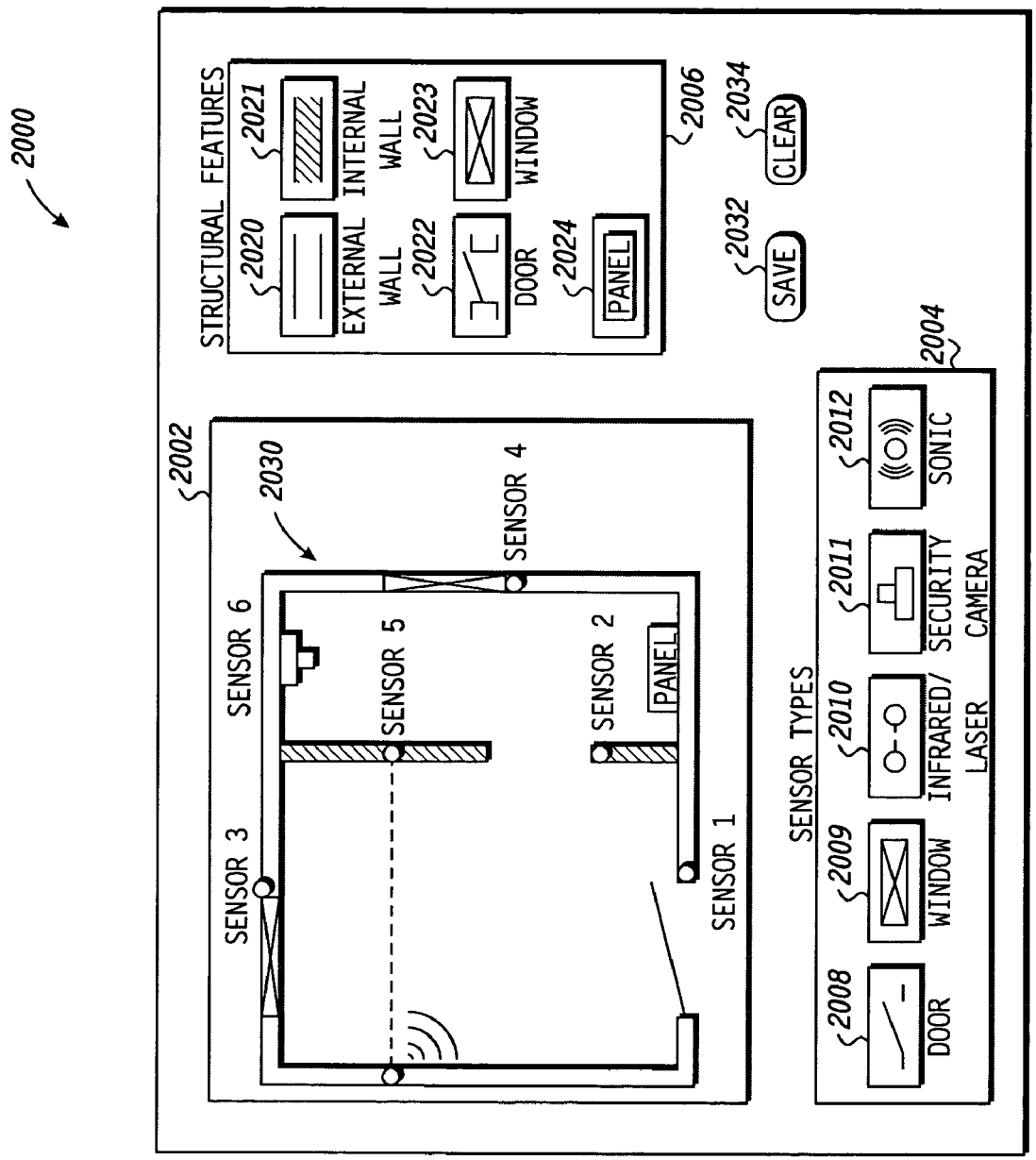
FIG. 20 is a diagram illustrating an exemplary graphical user interface to generate a premises diagram in accordance with at least one embodiment of the present disclosure.

Referring to FIG. 20, an illustrative implementation of the premises diagram generation GUI is depicted in accordance with at least one embodiment of the present disclosure. As shown, the premises diagram generation GUI 2000 includes a premises layout window 2002, a sensor type selection list 2004, and a structure features selection list 2006. The premises layout window 2002 is used to graphically display the premises layout being constructed by the user. The sensor type selection list 2004 includes selectable icons for one or more sensor types. To illustrate, the sensor type selection list 2004 may include an icon 2008 representing a door alarm, an icon 2009 representing a window alarm, an icon 2010 representing an infrared/laser trip-line sensor or motion sensor, an icon 2011 representing a security camera, and an icon 2012 representing a sonic sensor (e.g., a broken glass sensor). The structure features selection list 2006 includes selectable icons for one or more structural feature types, such as an icon 2020 for an external wall, an icon 2021 for an internal wall, an icon 2022 for a door, an icon 2023 for a window, and an icon 2024 for an alarm panel.

In one embodiment, the user selects icons to insert the corresponding feature into the premises layout window 2002 and then altering their position, orientation, and dimensions until a layout 2030 of the monitored premises, including positioned alarm sensors, is generated. Further, the user may select the sensor icons in the premises layout window 2002 to input additional information regarding the selected alarm sensor, such as an arm/disarm schedule for the particular alarm sensor, a sensitivity setting, its means of connection (e.g., wirelessly, via an alarm panel, chained via another alarm sensor), and the like. The user can also select the alarm sensor icons to input various operating parameters or rules. To illustrate, sensor 6 (a security video camera) can be configured by the user to capture video content and transmit the captured video content to the television 100 (FIG. 1) in response to a breach detected by either sensor 1 (a door sensor) or sensor 4 (a window sensor). If the user is satisfied with the created premises layout, the user can select the save button 2032 or, if the user wants to start over or cancel the generation process, the user can select the cancel button 2034.

Figure 21:
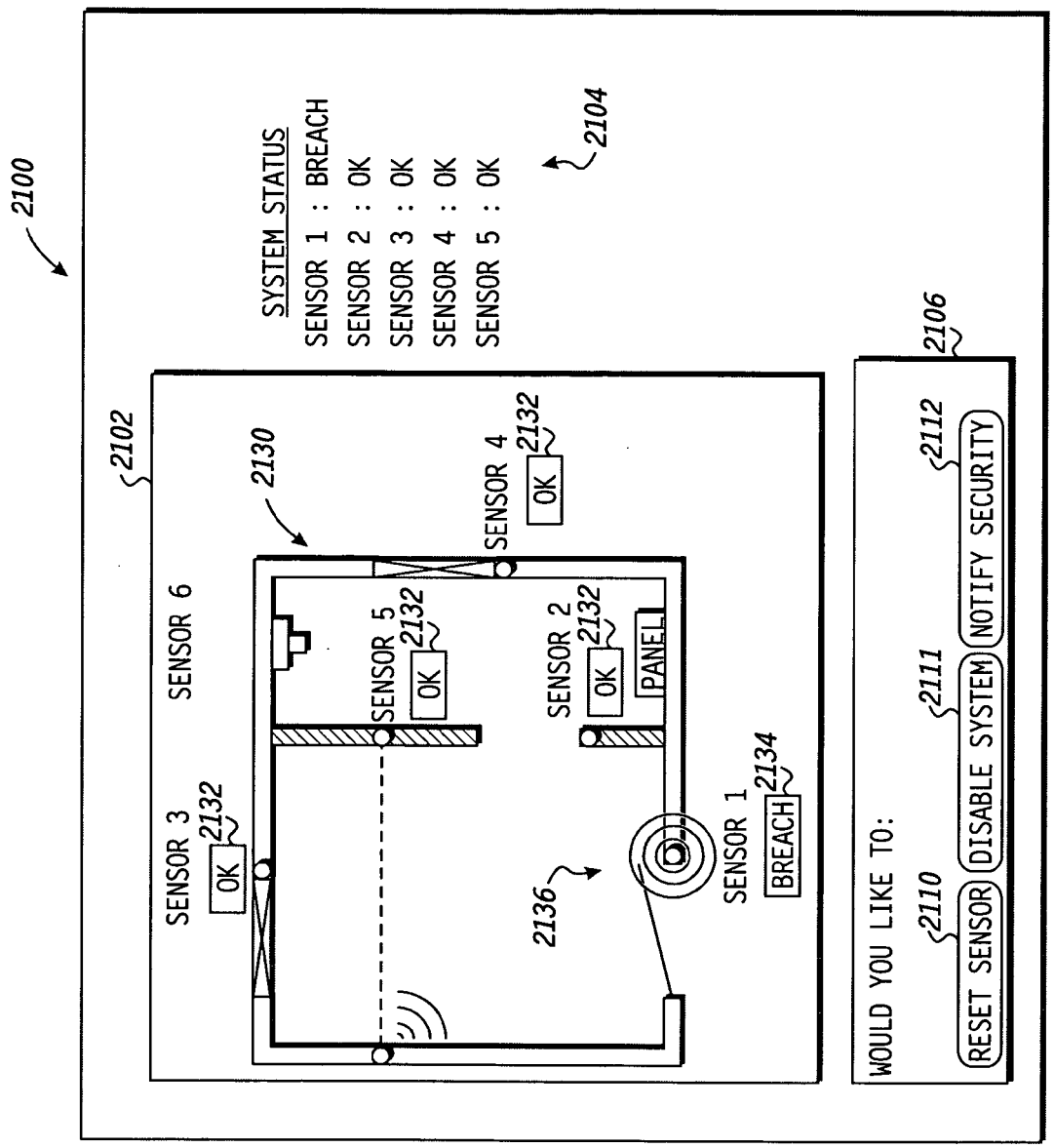
FIG. 21 is a diagram illustrating an exemplary graphical user interface to display a premises diagram and one or more alarm statuses in accordance with at least one embodiment of the present disclosure.

Referring to FIG. 21, an exemplary implementation of a premises diagram GUI is illustrated in accordance with at least one embodiment of the present disclosure. As depicted, the premises diagram GUI 2100 includes a premises layout window 2102, a system status window 2104, and an action interface window 2106. In the illustrated example, the premises diagram GUI 2100 corresponds to the premises diagram 2030 described with reference to FIG. 20. The system status window 2104 includes a textual or other graphical representation of the current alarm status of the alarm sensors included in the premises diagram 2130. In the illustrated example, the system status window 2104 includes a list of each alarm sensor followed by its current alarm status. The action interface window 2106 includes one or more selectable buttons associated with corresponding actions. In one embodiment, the actions represented by the selectable buttons of the action interface window 2106 dynamically change in response to changing security parameters, such as in response to a potential breach, a malfunction, and the like. In the illustrated example, a potential breach is detected at sensor 2 and the action interface window 2106 therefore includes a selectable button 2110 to initiate an action to reset the sensor 2, a selectable button 2111 to initiate an action to disable the security system, and a selectable button 2112 to initiate an action to notify a security operations entity.

The premises diagram 2130, in one embodiment, allows a user to quickly assess the current alarm status of the monitored premises by providing an easily-discernable graphical representation of the layout of the monitored premises and the alarm statuses of the alarm sensors. The premises diagram 2130 can include various graphical indicators located at or near the sensor icons to identify their current statuses. To illustrate, assuming that sensor 2 indicates a potential breach while sensors 1 and 3-5 do not, an "OK" status icon 2132 can be displayed near the sensors 2-5, while a "BREACH" status icon 2134 can be displayed near the sensor 1. The status icons 2132 and 2134 further can include various graphical features, such as a green tint for an "OK" status, a red tint for a "BREACH" status, flashing text, and the like. Further, for a breached sensor, a more noticeable graphical identifier, such as a bull's eye target icon 2136, may be used to allow a user to more readily identify the location of the breached sensor.

After reviewing the premises diagram 2130, the user may select one or more of the selectable buttons 2110, 2111 or 2112 of the alarm action interface 2106 so as to initiate a particular action, such as the resetting of the sensor, the disabling of the system, or the notification of a security operations entity. Further, the actions available for selection may change based on the state of the alarm sensors or the monitored premises.

Figure 22:
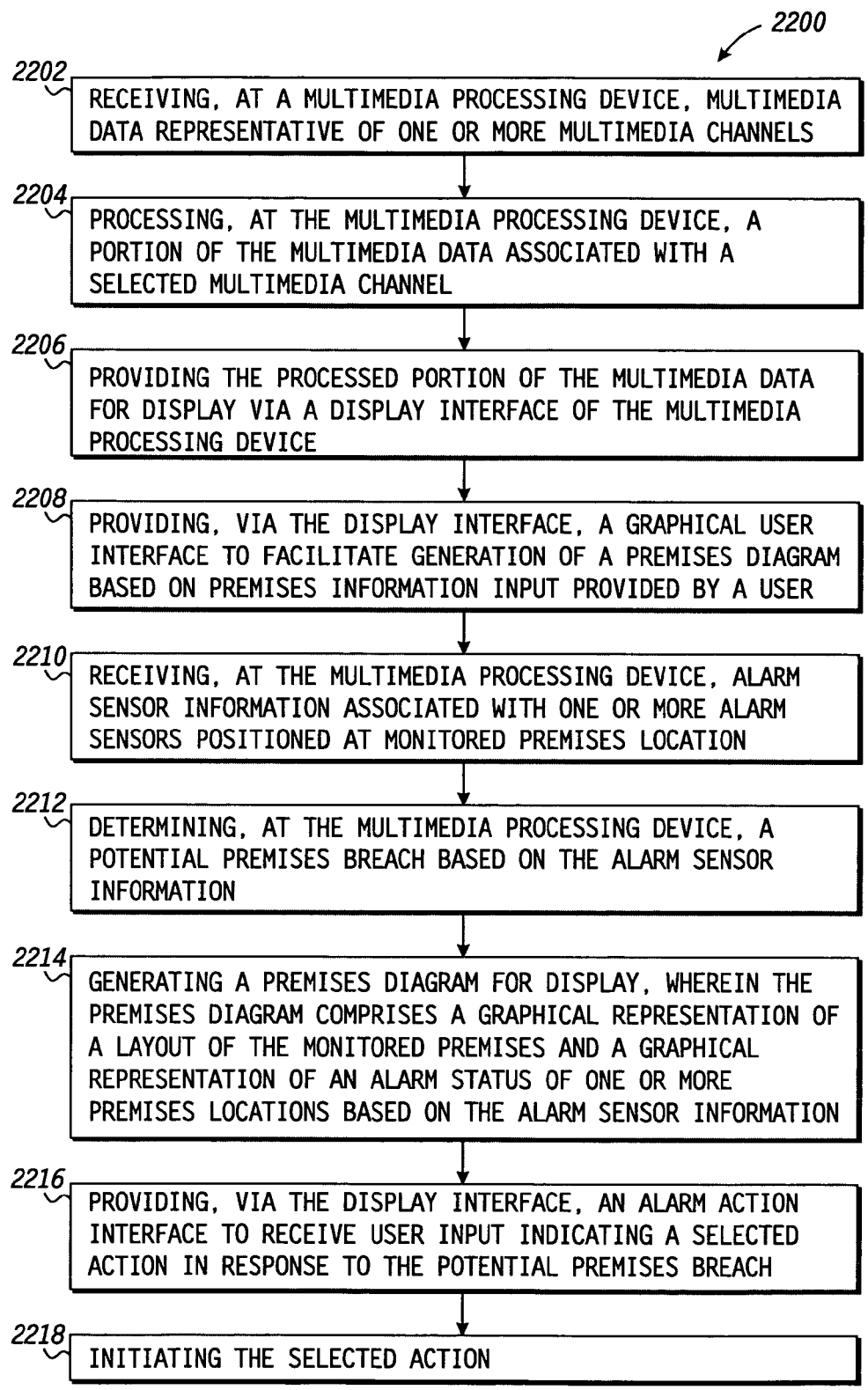
FIG. 22 is a flow diagram illustrating an exemplary method for security monitoring via a multimedia processing device in accordance with at least one embodiment of the present disclosure.

Referring to FIG. 22, an exemplary method 2200 for providing security monitoring and multimedia processing at a multimedia processing device is illustrated in accordance with at least one embodiment of the present disclosure. The multimedia processing device can include any of a variety of devices that process video and/or audio data, such as the networked television 100 of FIG. 1, a multimedia set-top box, and the like.

The method 2200 includes receiving, at the multimedia processing device, multimedia data representative of one or more multimedia channels at block 2202. The multimedia data can be received as, for example, a data packet-based network transmission, a terrestrial or satellite television transmission and the like. The multimedia data may be encoded based on any of a variety of encoding standards, such as a Motion Pictures Experts Group (MPEG) based standard. At block 2204, the method 2200 includes processing, at the multimedia processing device, at least a portion of the multimedia data associated with a selected multimedia channel. Processing the portion of the multimedia data can include, for example, decoding, decrypting, scaling, or transcoding the multimedia data. The method 2200 further includes providing the processed portion of the multimedia data for display via a display interface of the multimedia processing device. To illustrate, the multimedia processing device may include a set-top box connected to a television via a display controller of the multimedia processing device.

Proceeding to block 2208, the method 2200 includes providing, via the display interface, a graphical user interface to facilitate generation of a premises diagram based on premises information input provided by a user. An exemplary premises diagram generation GUI is described in greater detail with reference to FIGS. 19 and 20. At block 2210, the method 2200 includes receiving, at the multimedia processing device, alarm sensor information associated with one or more alarm sensors positioned at monitored premises locations. The alarm sensor information can include, for example, the current status of the corresponding alarm sensor, such as "armed," "disarmed," "breached," "malfunctioning," and the like. The alarm sensor information may be received at the multimedia processing device via a wired or wireless transmission, or via a central alarm panel using a legacy panel interface.

At block 2212, the method 2200 includes determining, at the multimedia processing device, a potential premises breach based on the alarm sensor information. The potential premises breach may be determined based on a "breached" alarm status of one or more sensors. Further, the multimedia processing device may utilize a verification process to more accurately ascertain whether there is indeed a premises breach. At block 2214, the method 2200 includes generating a premises diagram for display, where the premises diagram includes a graphical representation of a layout of the monitored premises and a graphical representation of an alarm status of one or more premises locations based on the alarm sensor information. An exemplary premises diagram GUI is discussed in greater detail herein with reference to FIGS. 20 and 21.

At block 2216, the method 2200 includes providing, via the display interface, an alarm action interface to receive user input indicating a selected action in response to the potential premises breach. The alarm action interface, in one embodiment, is provided as part of the premises diagram generated at block 2214. At block 2218, the method 2200 includes initiating the selected action. In one embodiment, the selected action includes suppressing an alarm and initiating the selected action includes resetting an alarm sensor associated with the potential premises breach. In another embodiment, the selected action includes notifying a security operations entity, and the selected action includes transmitting a notification to a security operations entity, where the notification can include, for example, an email, a voice message, a facsimile transmission, and the like, and can be transmitted via a telephony interface or a data packet network interface.

Although the security monitoring techniques are described in the context of the networked television 100 and a modular card for ease of illustration, these techniques may be implemented in other multimedia processing devices, such as a set-top box, using the guidelines provided herein without departing from the scope of the present disclosure. For example, referring to FIG. 23, an illustrative embodiment of a computer system to implement one or more of the disclosed techniques is shown and is designated 2300. The computer system 2300 can include a set of instructions that can be executed to cause the computer system 2300 to perform any one or more of the methods or computer based functions disclosed herein. The computer system 2300 may operate as a standalone device or may be connected, e.g., using a network, to other computer systems or peripheral devices.

The computer system 2300 can be implemented as or incorporated into various multimedia processing devices, such as a set-top box, an Internet Protocol television (IPTV), a personal computer (PC), a tablet PC, a personal digital assistant (PDA), a mobile device, a palmtop computer, a laptop computer, a desktop computer, a communications device, a wireless telephone, a land-line telephone, a control system, a camera, a personal trusted device, a web appliance, a network router, switch or bridge, or any other machine capable of executing a set of instructions (sequential or otherwise) that specify actions to be taken by that machine. In a particular embodiment, the computer system 2300 can be implemented using electronic devices that provide voice, video or data communication. Further, while a single computer system 2300 is illustrated, the term "system" shall also be taken to include any collection of systems or sub-systems that individually or jointly execute a set, or multiple sets, of instructions to perform one or more computer functions.

Figure 23:
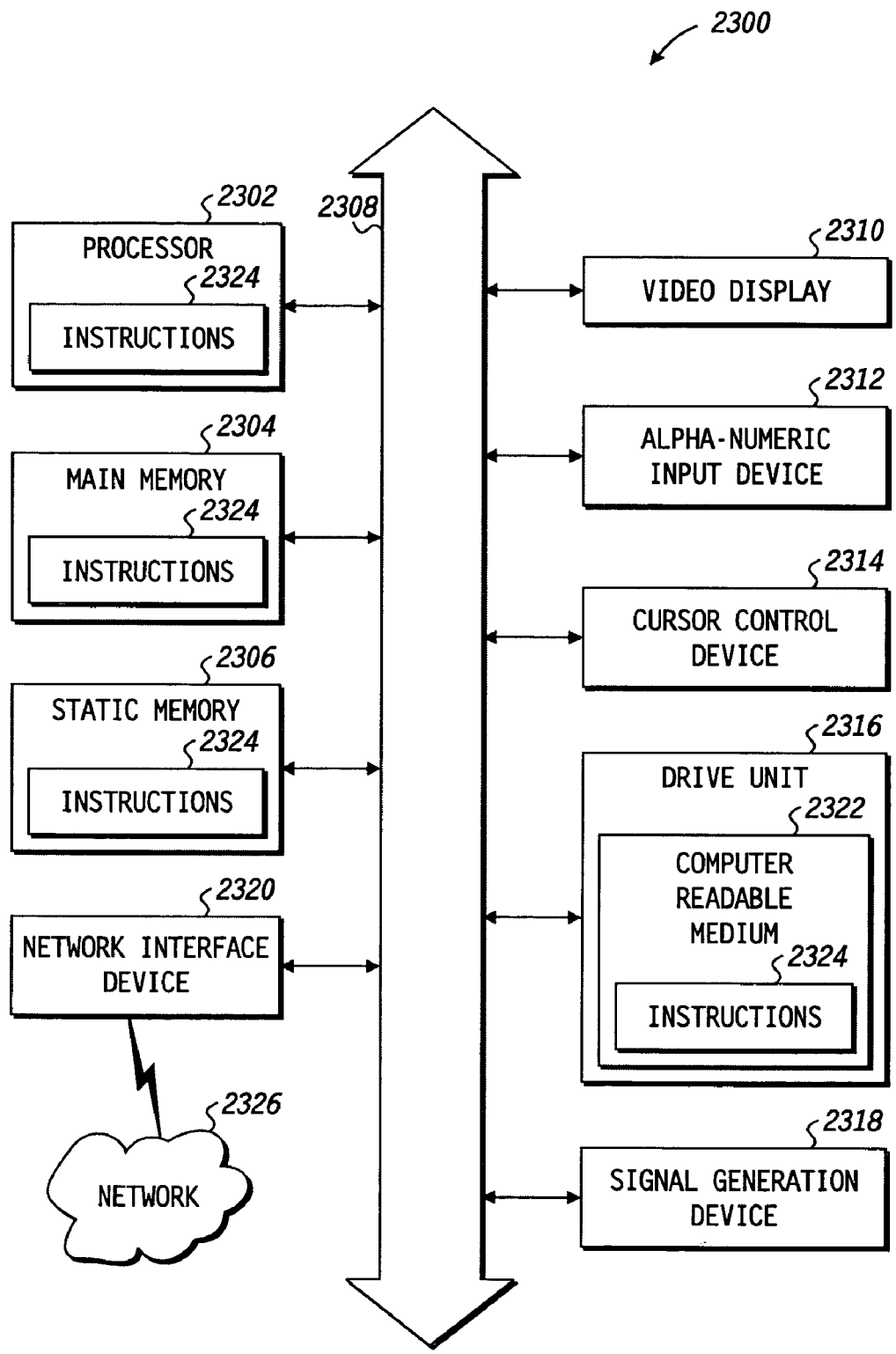
FIG. 23 is a block diagram illustrating an exemplary general computer system for implementing one or more of the techniques of FIGS. 1-22 in accordance with at least one embodiment of the present disclosure.

As illustrated in FIG. 23, the computer system 2300 may include a processor 2302, e.g., a central processing unit (CPU), a general processing unit (GPU), or both. Moreover, the computer system 2300 can include a main memory 2304 and a static memory 2306 that communicate via a bus 2308. As shown, the computer system 2300 may further include a video display unit 2310, such as a liquid crystal display (LCD), an organic light emitting diode (OLED), a flat panel display, a solid state display, or a cathode ray tube (CRT). Additionally, the computer system 2300 may include an input device 2312, such as a button pad, and a user input device 2314, such as a remote control input or a video game control. The computer system 2300 can also include a disk drive unit 2316, a signal generation device 2318, such as a speaker or remote control, and a network interface device 2320.

In a particular embodiment, as depicted in FIG. 23, the disk drive unit 2316 may include a computer-readable medium 2322 in which one or more sets of instructions 2324, e.g. software, can be embedded. Further, the instructions 2324 may embody one or more of the techniques as described herein. In a particular embodiment, the instructions 2324 may reside completely, or at least partially, within the main memory 2304, the static memory 2306, and/or within the processor 2302 during execution by the computer system 2300. The main memory 2304 and the processor 2302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 2324 or receives and executes instructions 2324 responsive to a propagated signal, so that a device connected to a network 2326 can communicate voice, video or data over the network 2326. Further, the instructions 2324 may be transmitted or received over the network 2326 via the network interface device 2320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any computer-readable medium and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A set-top box device comprising:
   a display controller to output video for display at a display device;
   a memory;
   a first modular card receptacle to receive digital multimedia content; and
   a security modular card coupled to the first modular card receptacle, the security module card comprising:
      a security control module including:
         logic to receive alarm sensor information associated with a plurality of alarm sensors including a first alarm sensor and a second alarm sensor;
         logic to detect a potential premises breach based on alarm sensor information from the first alarm sensor; and
         logic to detect a potential malfunction of the first alarm sensor based on a comparison of alarm sensor information from the second alarm sensor with the alarm sensor information from the first alarm sensor;
      a premises diagram generation module including:
         logic to provide a graphical user interface for display at the display device, wherein the graphical user interface facilitates generation of a premises diagram;
         logic to receive user input that includes information describing a premises to be monitored;
         logic to store the user input in the memory; and logic to generate the premises diagram based on the user input; and an alarm premises display module including:

logic to provide the premises diagram for display, via the display device, wherein the premises diagram illustrates a layout of the premises; and logic to provide a representation of an alarm status of one or more premises locations based on the alarm sensor information associated with the plurality of alarm sensors.

2. The set-top box device of claim 1, further comprising a network interface to couple the set-top box device to a data network, wherein the alarm sensor information associated with the plurality of alarm sensors is received from the data network via the network interface.

3. The set-top box device of claim 1, wherein the security control module further includes logic to direct the alarm premises display module to provide a user notification in response to detecting the potential malfunction of the first alarm sensor.

4. The set-top box device of claim 1, wherein the security control module further includes logic to perform at least one of notifying a security operations entity and sounding an alarm siren at the monitored premises in response to detecting an absence of the potential malfunction of the first alarm sensor.

5. The set-top box device of claim 1, wherein the security modular card further comprises an alarm panel interface to an alarm panel, wherein at least a portion of the alarm sensor information associated with the plurality of alarm sensors includes information from the alarm panel interface.

6. The set-top box device of claim 1, further comprising a telephony interface to a telephone network, wherein the security control module further includes logic to provide premises breach information to a security operations entity via the telephone network in response to detecting an absence of the potential malfunction of the first alarm sensor.

7. The set-top box device of claim 1, wherein the security control module further includes logic to direct the alarm premises display module to provide the premises diagram for display in response to detecting the potential malfunction of the first alarm sensor.

8. The set-top box device of claim 7, wherein the alarm premises display module includes logic to provide an alarm action interface responsive to user input indicating a selected action.

9. The set-top box device of claim 8, wherein the selected action comprises at least one of suppressing an alarm, notifying a security operations entity, and disabling an alarm system.

10. The set-top box device of claim 1, wherein the security modular card further comprises a remote notification module coupled to the alarm premises display module and the security control module, wherein the remote notification module includes logic to transmit an electronic notification in response to detecting the potential premises breach.

11. The set-top box device of claim 10, wherein the electronic notification comprises at least one of an email, a voice message, a text message, and a facsimile transmission.

12. The set-top box device of claim 1, further comprising a remote access module coupled to the alarm premises display module and the security control module, wherein the remote access module includes logic to provide webpage information associated with the alarm sensor information associated with the plurality of alarm sensors.

13. The set-top box device of claim 1, wherein:

the security control module further includes logic to automatically capture video content from one or more security video cameras in response to detecting a potential premises breach; and the alarm premises display module further includes logic to send the captured video content to the display device.

14. The set-top box device of claim 1, wherein the information describing the premises to be monitored includes orientation and dimensions of at least one of the plurality of alarm sensors.

15. The set-top box device of claim 1, wherein the information describing the premises to be monitored includes at least one of position and type of the plurality of alarm sensors, wherein the type of each of the plurality of alarm sensors includes at least one of a door alarm, a window alarm, an infrared trip-line sensor, a laser trip-line sensor, a motion sensor, a security camera, and a sonic sensor.

16. The set-top box device of claim 1, wherein the comparison comprises correlating the alarm sensor information from the at least one second alarm sensor with the alarm sensor information from the first alarm sensor.

17. A set-top box device comprising:

a multimedia data interface to receive digital multimedia data representative of one or more multimedia channels;

a display interface to a display device, the display interface to process the digital multimedia data for display at the display device;

a security control module including:

logic to receive alarm sensor information associated with a plurality of alarm sensors including a first alarm sensor and second alarm sensor;

logic to detect a potential premises breach based on alarm sensor information from the first alarm sensor; and logic to detect a potential malfunction of the first alarm sensor based on a comparison of alarm sensor information from the second alarm sensor with the alarm sensor information from the first alarm sensor;

a premises diagram generation module including:

logic to provide a graphical user interface for display at the display device, wherein the graphical user interface facilitates generation of a premises diagram;

logic to receive user input that includes information describing a premises to be monitored; and logic to generate the premises diagram based on the user input; and an alarm premises display module coupled to the security control module and coupled to the display interface, the alarm premises display module including:

logic to provide the premises diagram for display via the display interface, wherein the premises diagram illustrates a layout of the monitored premises; and logic to provide a representation of an alarm status of one or more premises locations based on the alarm sensor information associated with the plurality of alarm sensors.

18. The set-top box of claim 17, wherein the multimedia data interface comprises a packet-based data network interface.

19. The set-top box of claim 18, wherein the packet-based data network interface is compatible with an interne protocol television network.

20. A method comprising:

receiving digital multimedia data representative of one or more multimedia channels;

processing a portion of the digital multimedia data associated with a selected multimedia channel;

providing the processed portion of the digital multimedia data for display at a display device;

receiving alarm sensor information associated with a plurality of alarm sensors positioned at one or more locations of a monitored premises;

detecting a potential premises breach based on alarm sensor information from a first alarm sensor of the plurality of alarm sensors; and detecting a potential malfunction of the first alarm sensor based on a correlation of alarm sensor information from at least one second alarm sensor of the plurality of alarm sensors with the alarm sensor information from the first alarm sensor; and generating a premises diagram at the set-top box device for display at the display device, the premises diagram generated based on user input that includes information describing the monitored premises, wherein the premises diagram comprises a graphical representation of a layout of the monitored premises and a graphical representation of an alarm status of the one or more locations based on the alarm sensor information associated with the plurality of alarm sensors.

21. The method of claim 20, further comprising:

providing an alarm action interface to receive a second user input indicating a selected action in response to detecting the potential premises breach; and initiating the selected action.

22. The method of claim 21, wherein the selected action comprises suppressing an alarm and wherein initiating the selected action comprises resetting the first alarm sensor.

23. The method of claim 21, wherein the selected action comprises notifying a security operations entity and wherein initiating the selected action comprises transmitting a notification to the security operations entity.

24. The method of claim 23, wherein the notification is transmitted via at least one of a data-packet network interface and a telephony interface.

25. The method of claim 20, further comprising providing a graphical user interface to receive the user input that includes information describing the monitored premises.

26. The method of claim 20, further comprising transmitting an electronic notification representative of the potential premises breach.

27. The method of claim 20, further comprising providing webpage information for access by a user, wherein the webpage information is associated with the alarm sensor information associated with the plurality of alarm sensors.

28. A set-top box device including a processor and a non-transitory computer readable storage medium embodying a computer program, the computer program comprising instructions that are executable by the processor to cause the set-top box device to:

receive digital multimedia data;

process the digital multimedia data for display at a display device;

receive alarm sensor information from a plurality of alarm sensors, the plurality of alarm sensors positioned at a monitored premises;

detect a potential premises breach based on the alarm sensor information from a first alarm sensor of the plurality of alarm sensors;

detect a potential malfunction of the first alarm sensor based on a correlation of alarm sensor information from at least one second alarm sensor of the plurality of alarm sensors with the alarm sensor information from the first alarm sensor;

generate a premises diagram for display at the display device, the premises diagram generated based on user input that includes information describing the monitored premises, wherein the premises diagram comprises a graphical representation of a layout of the monitored premises and a graphical representation of an alarm status of one or more premises locations based on the alarm sensor information associated with the plurality of alarm sensors;

generate an alarm action interface for display at the display device, the alarm action interface to receive user input indicating a selected action in response to detecting the potential premises breach; and initiate the selected action.

29. The set-top box device of claim 28, wherein the computer program further comprises instructions to provide a graphical user interface for display, wherein the graphical user interface receives the user input that includes the information describing the monitored premises.

30. The set-top box device of claim 28, wherein the selected action comprises at least one of suppressing an alarm, notifying a security operations entity, notifying law enforcement, and disabling an alarm system.

* * * * *